Nov. 3, 1942.  H. W. MORGAN  2,301,067
AUTOMATIC LAMINATING MACHINE
Filed May 29, 1940

Harry W. Morgan
INVENTOR.

BY J. F. Ebert
ATTORNEY.

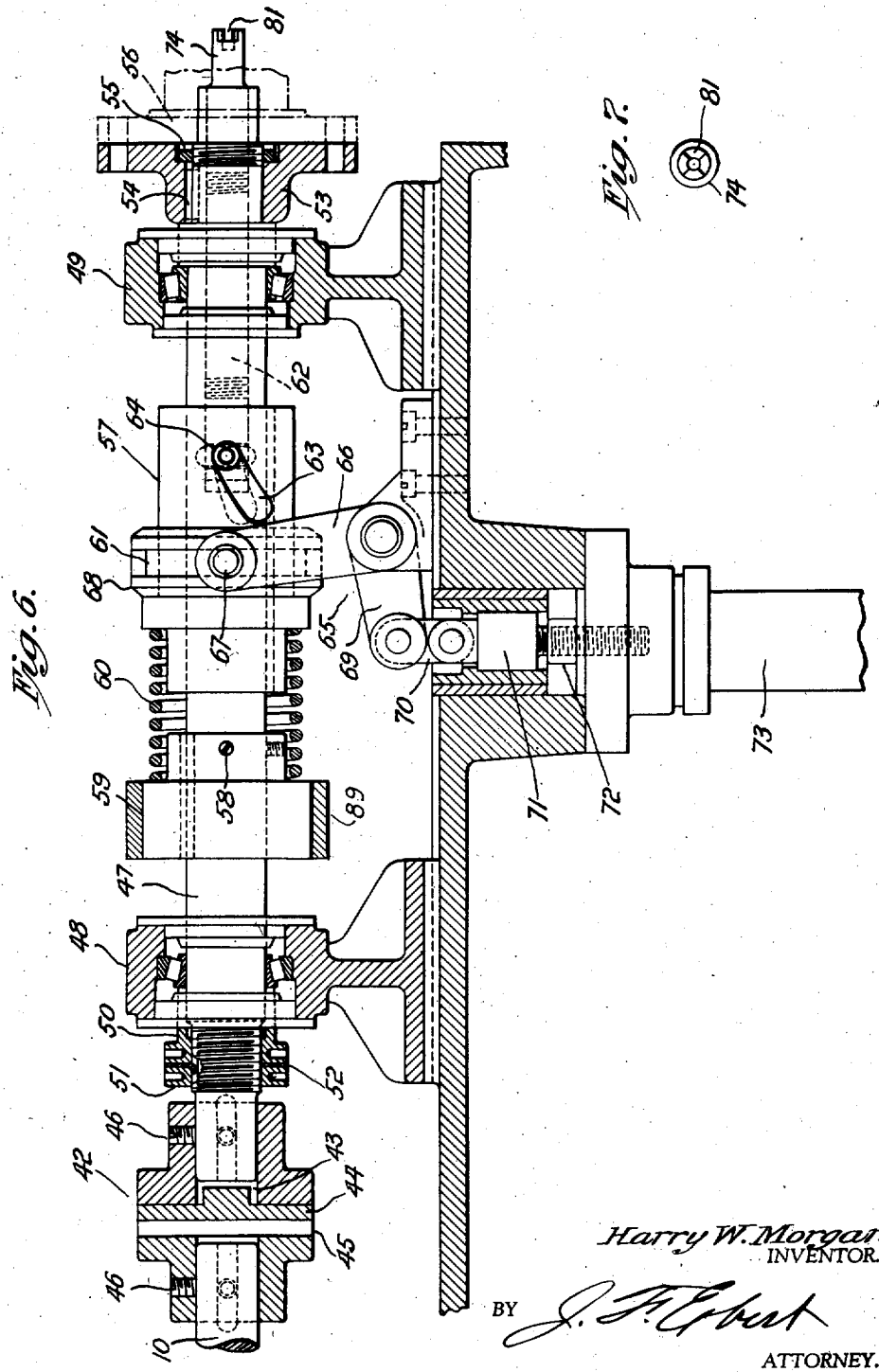

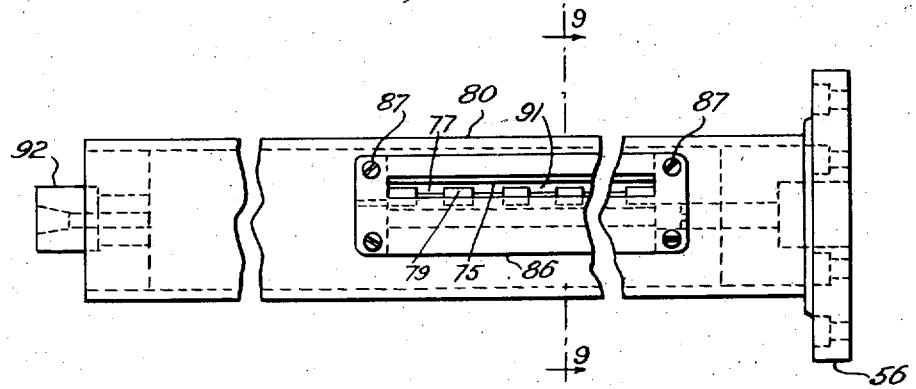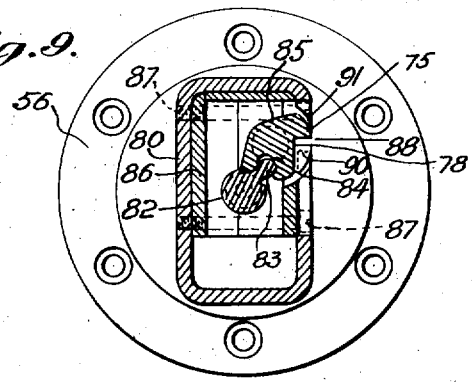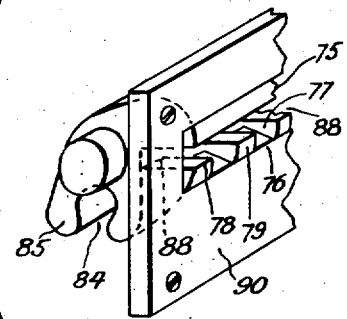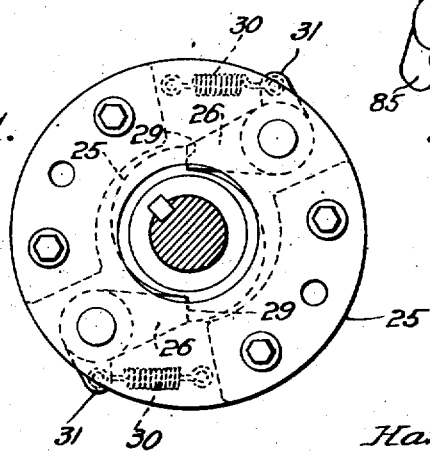

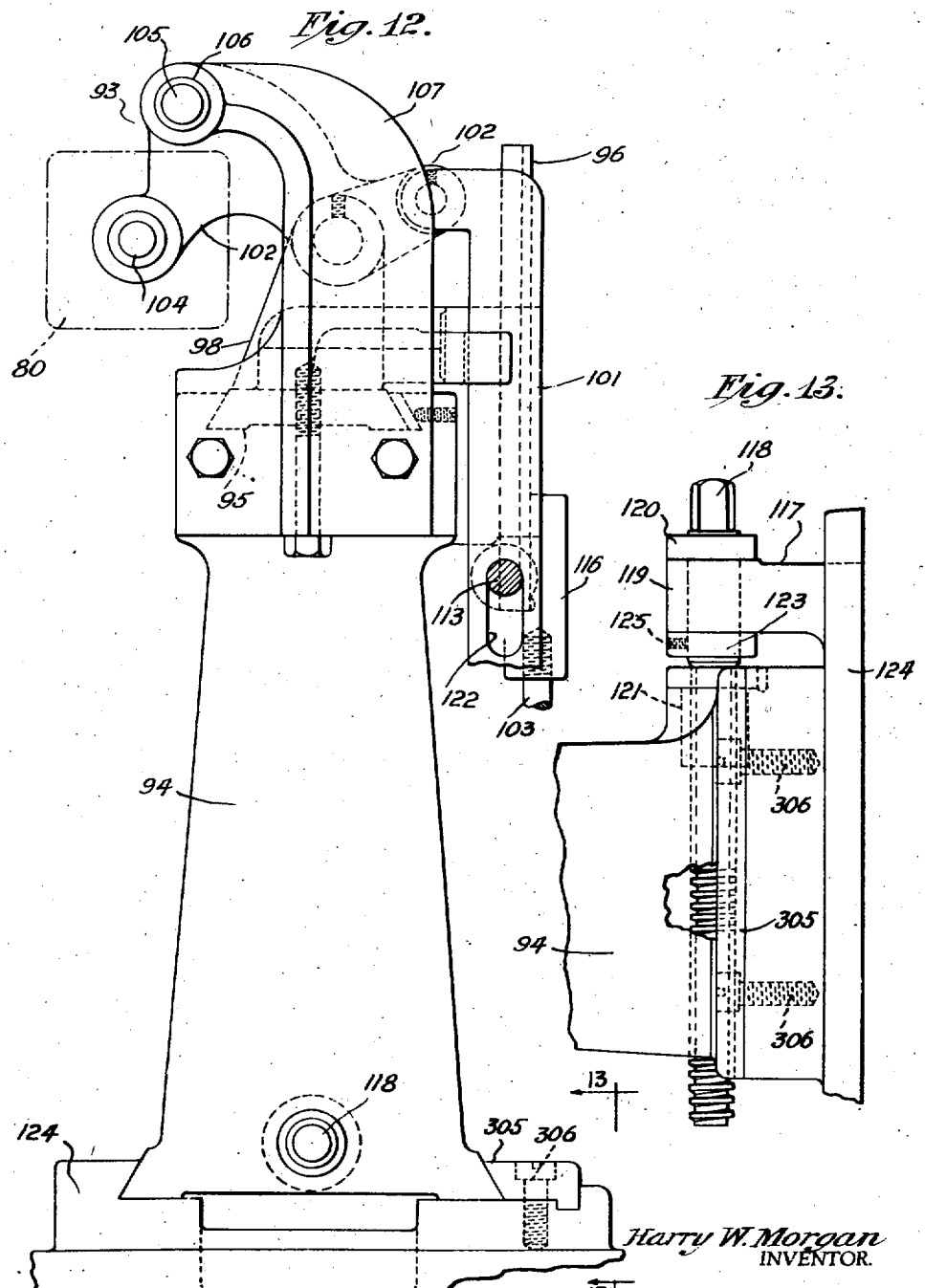

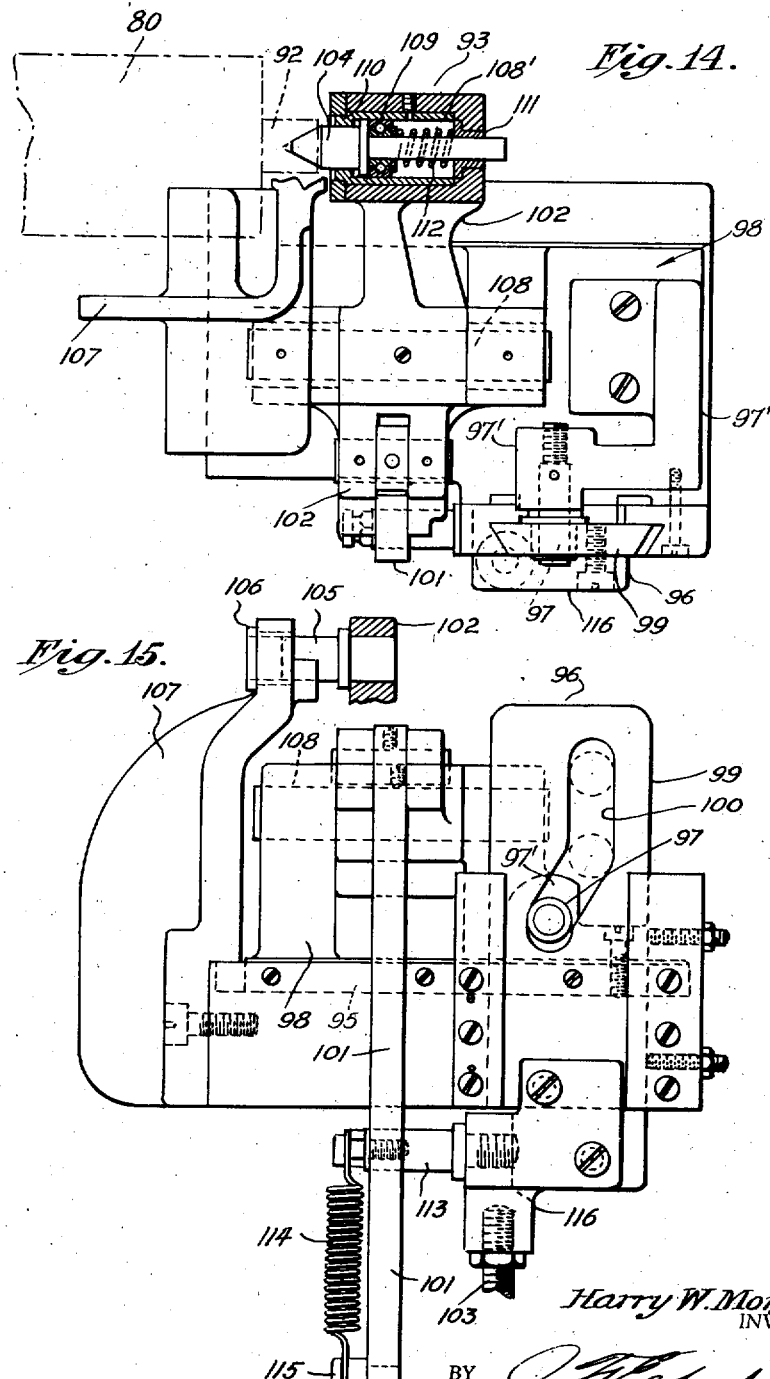

Nov. 3, 1942.   H. W. MORGAN   2,301,067
AUTOMATIC LAMINATING MACHINE
Filed May 29, 1940   21 Sheets-Sheet 8

INVENTOR
Harry W. Morgan
BY
ATTORNEY

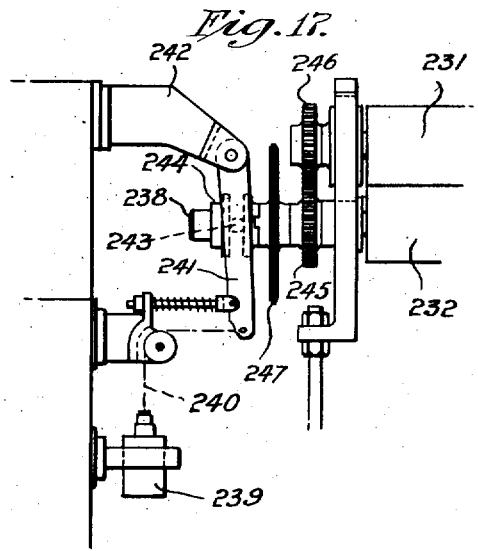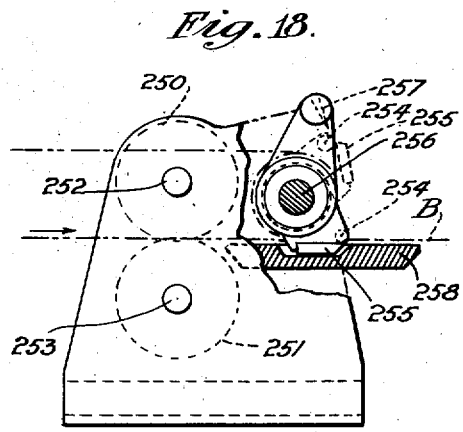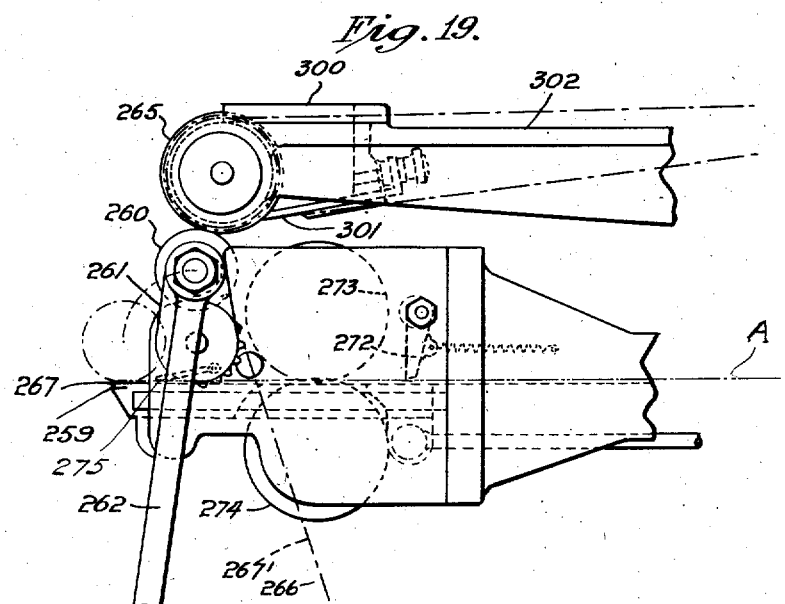

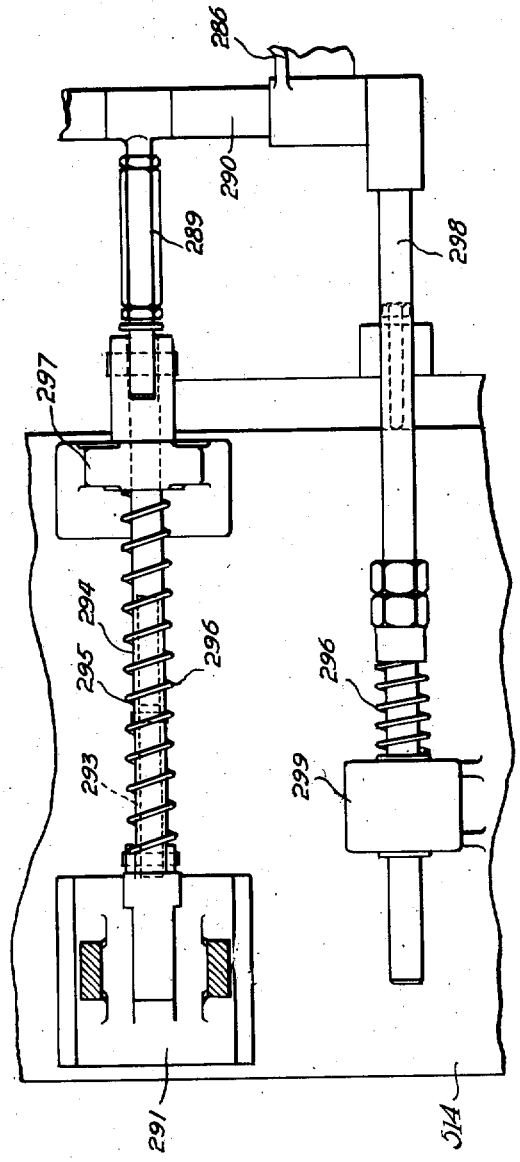
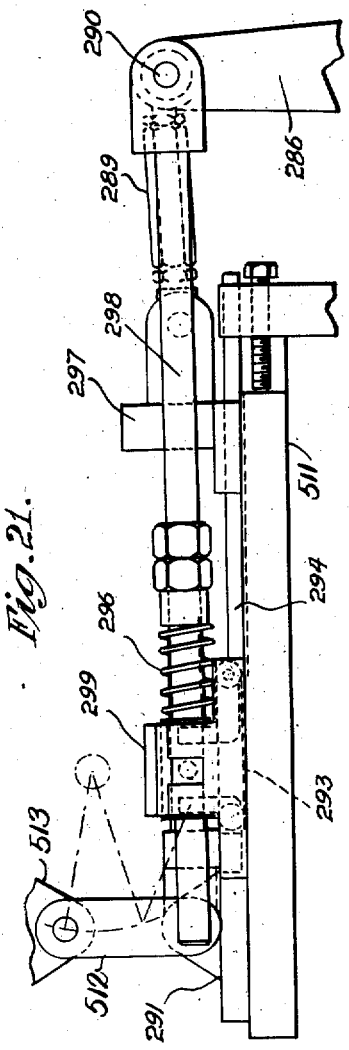

Nov. 3, 1942.                H. W. MORGAN                2,301,067
                       AUTOMATIC LAMINATING MACHINE
                         Filed May 29, 1940         21 Sheets-Sheet 11
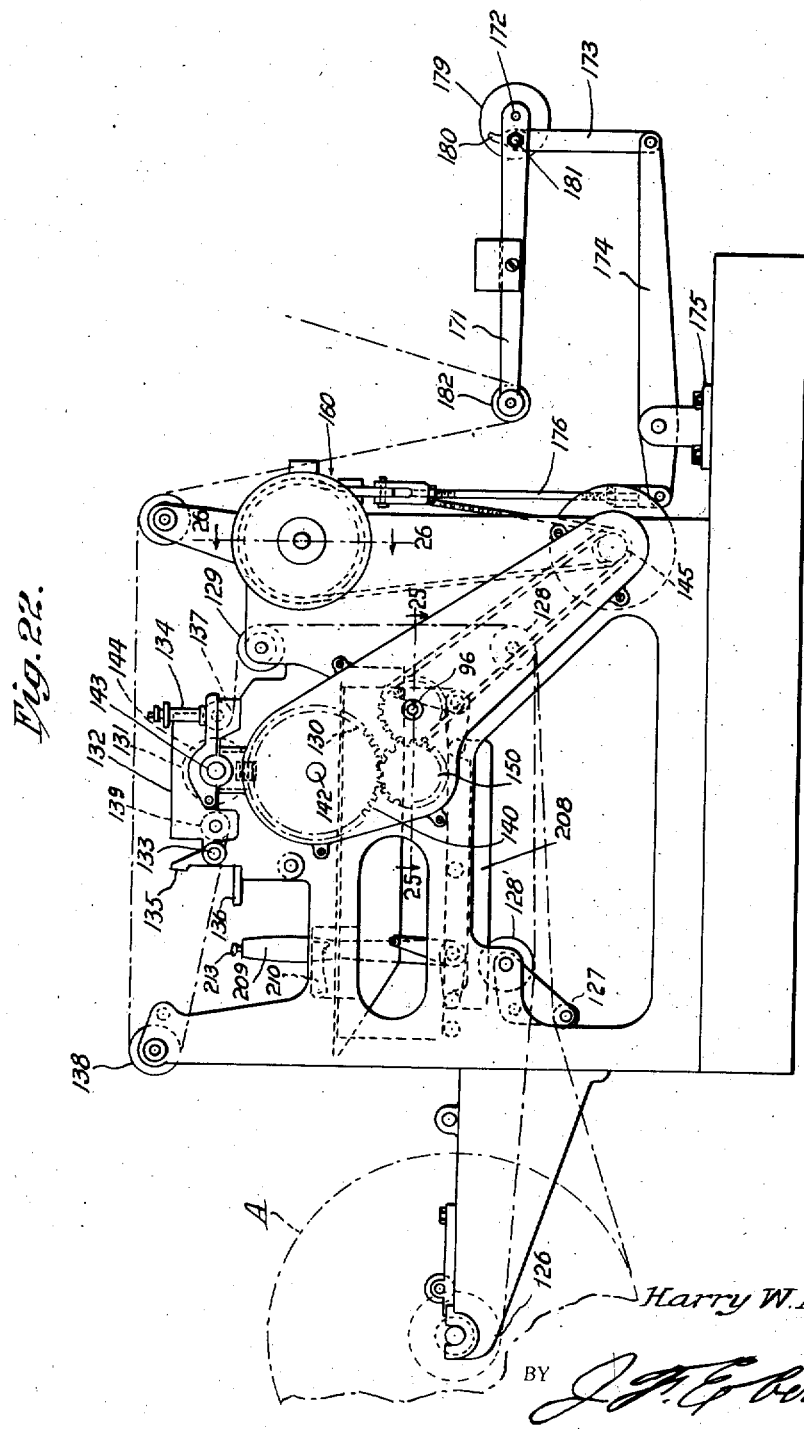
ATTORNEY.

Nov. 3, 1942.   H. W. MORGAN   2,301,067
AUTOMATIC LAMINATING MACHINE
Filed May 29, 1940   21 Sheets-Sheet 12
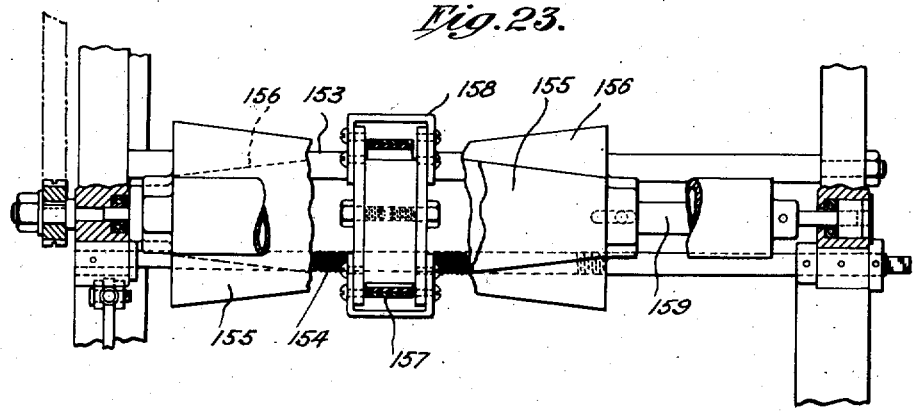
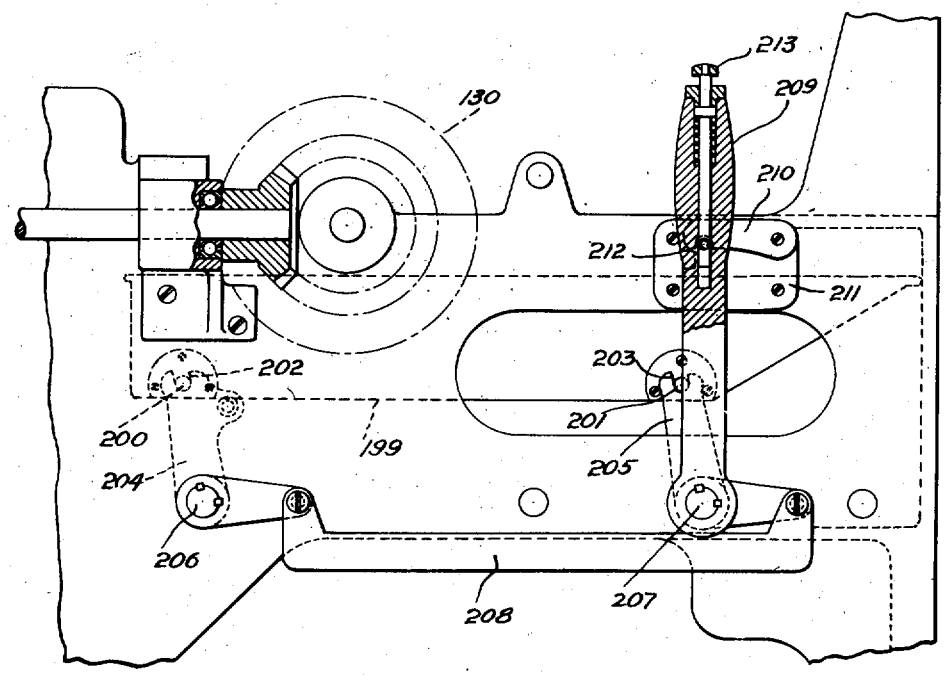
Harry W. Morgan
INVENTOR.
BY J. F. Robert
ATTORNEY.

Nov. 3, 1942.  H. W. MORGAN  2,301,067
AUTOMATIC LAMINATING MACHINE
Filed May 29, 1940  21 Sheets-Sheet 13
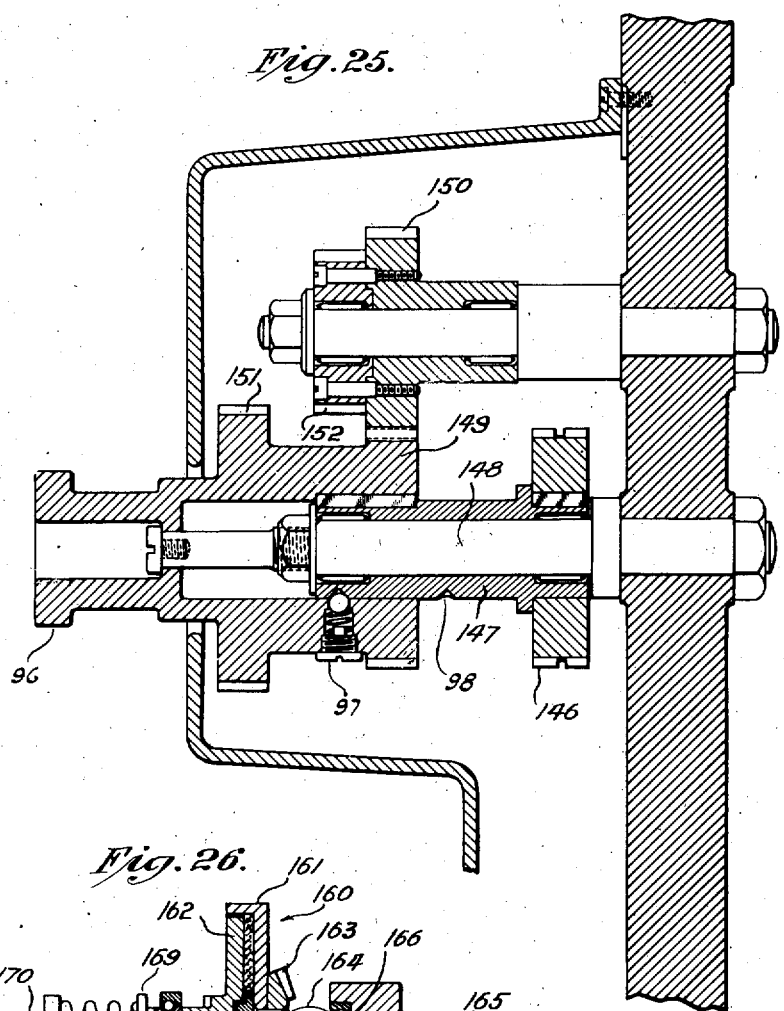
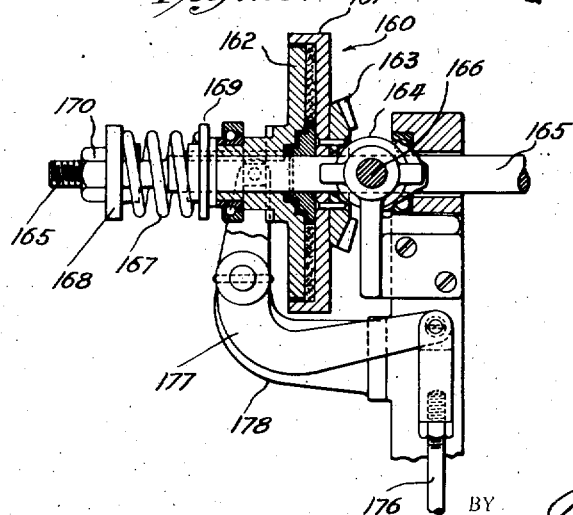
Harry W. Morgan
INVENTOR.
BY
ATTORNEY.

Nov. 3, 1942.   H. W. MORGAN   2,301,067
AUTOMATIC LAMINATING MACHINE
Filed May 29, 1940   21 Sheets-Sheet 14
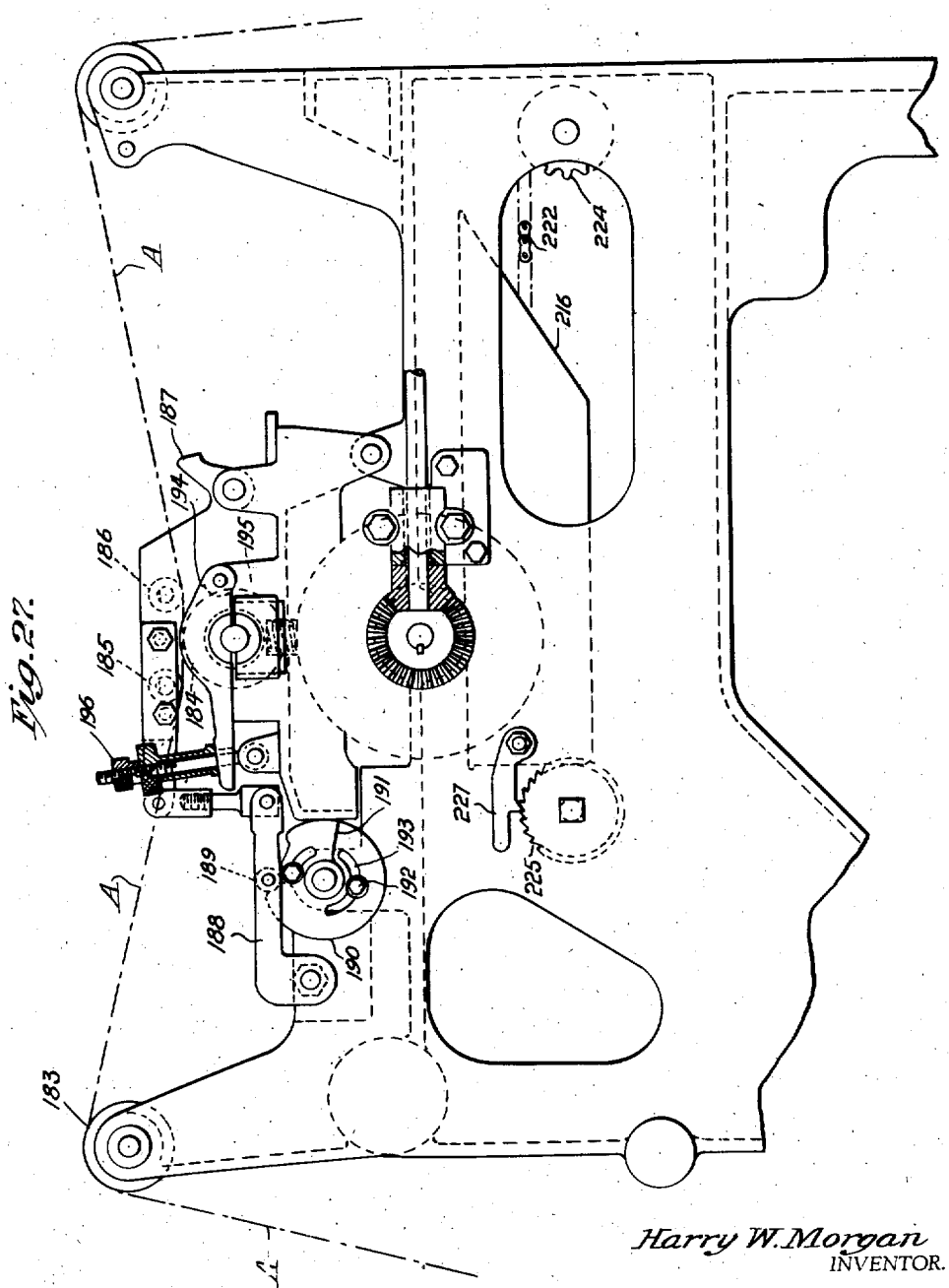
Harry W. Morgan
INVENTOR.
BY
ATTORNEY.

Nov. 3, 1942.       H. W. MORGAN       2,301,067
AUTOMATIC LAMINATING MACHINE
Filed May 29, 1940        21 Sheets-Sheet 15
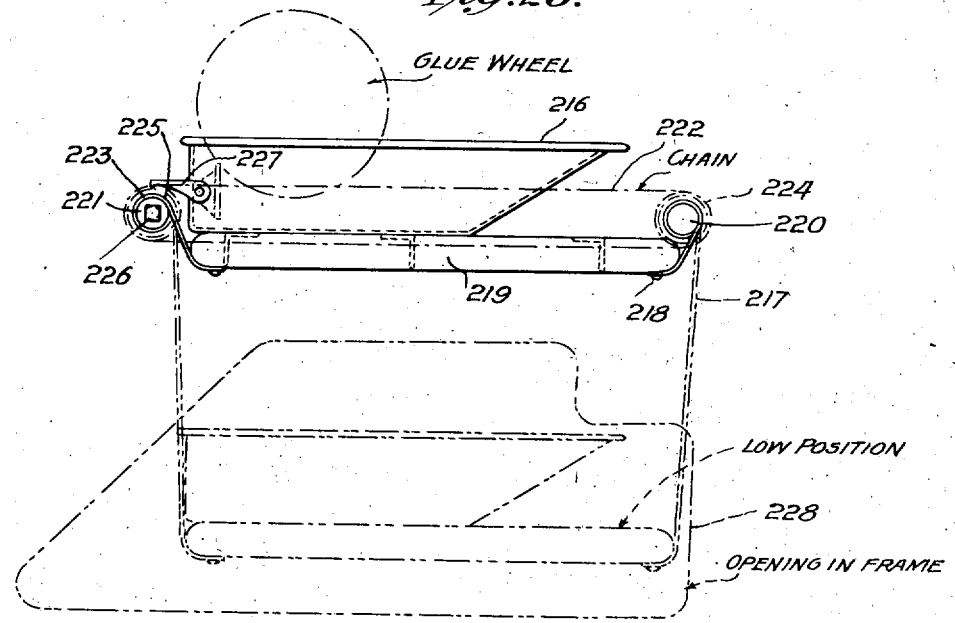
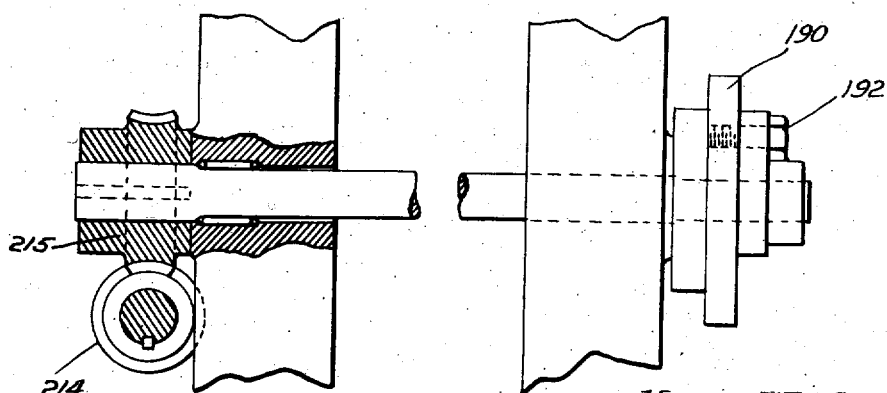
Harry W. Morgan
INVENTOR.
BY
ATTORNEY.

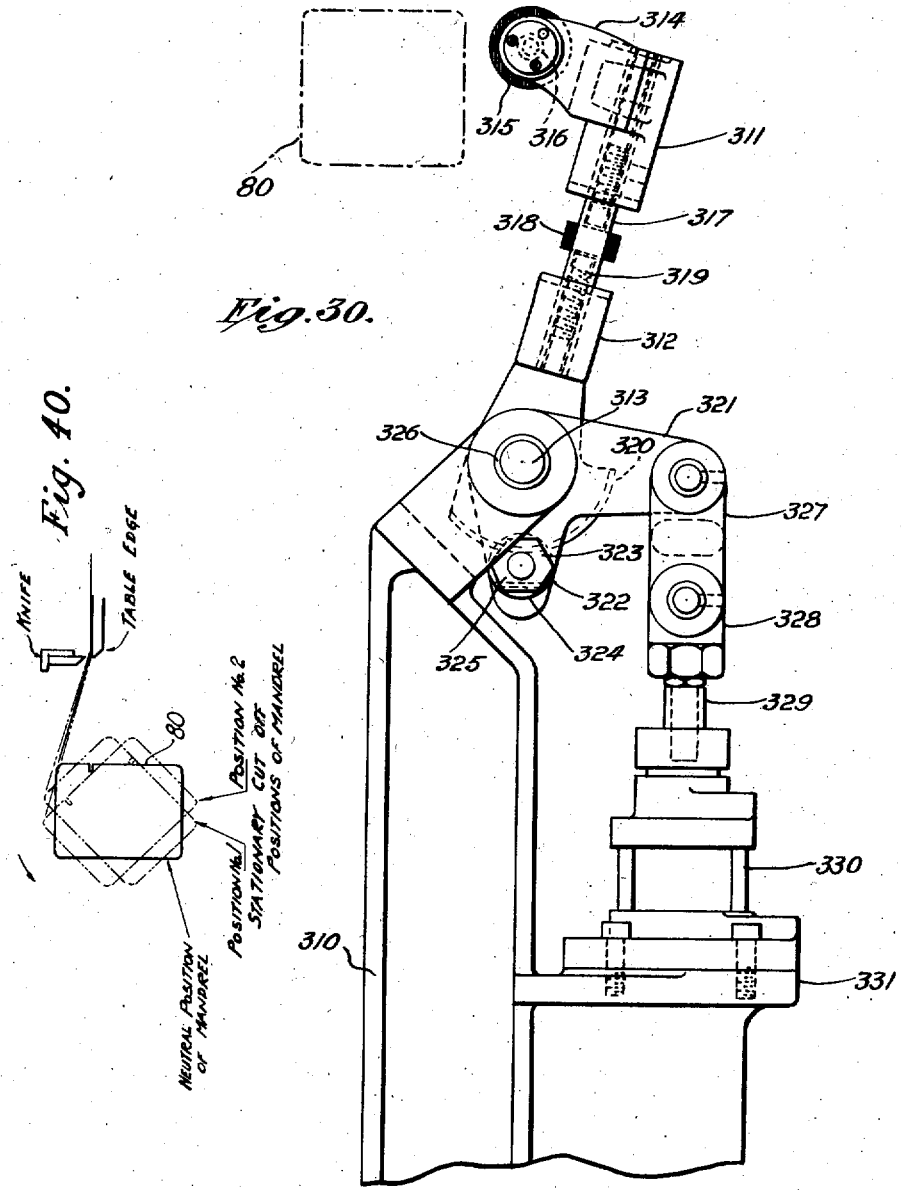

Nov. 3, 1942.     H. W. MORGAN     2,301,067
AUTOMATIC LAMINATING MACHINE
Filed May 29, 1940     21 Sheets-Sheet 17
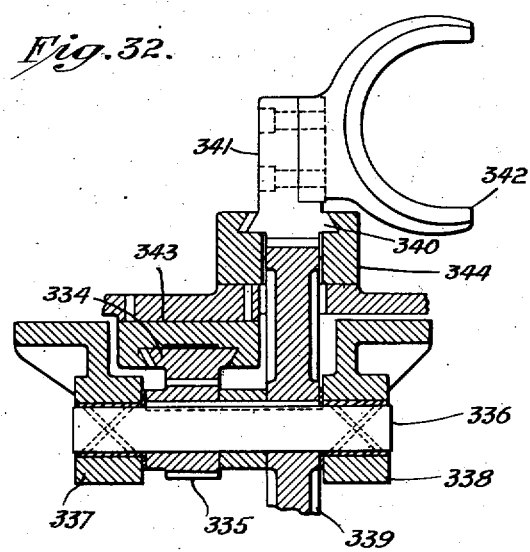
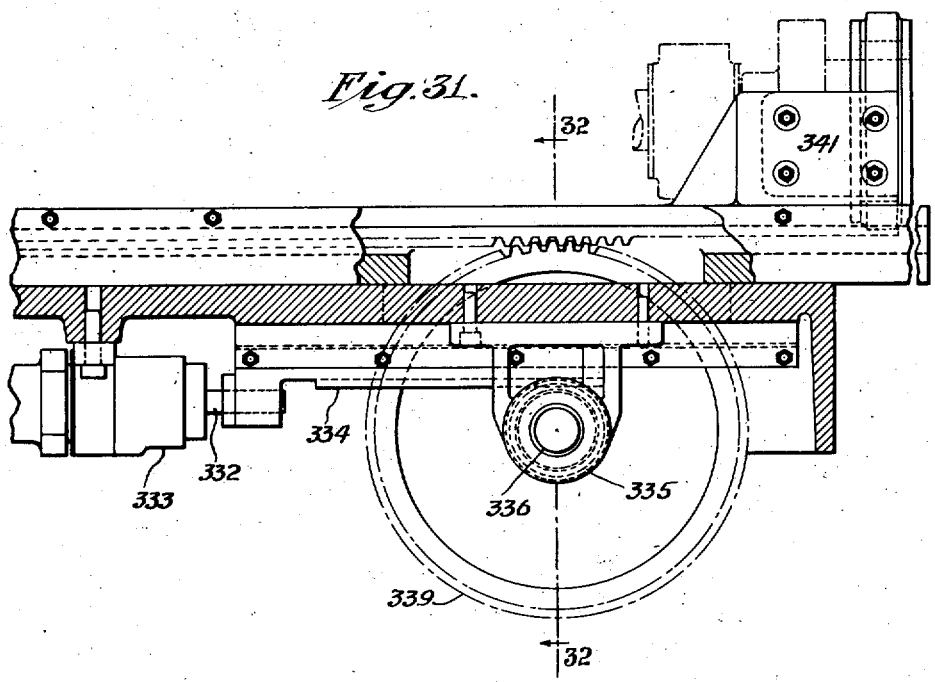
Harry W. Morgan
INVENTOR
BY
ATTORNEY Nov. 3, 1942.  H. W. MORGAN  2,301,067
AUTOMATIC LAMINATING MACHINE
Filed May 29, 1940  21 Sheets-Sheet 19
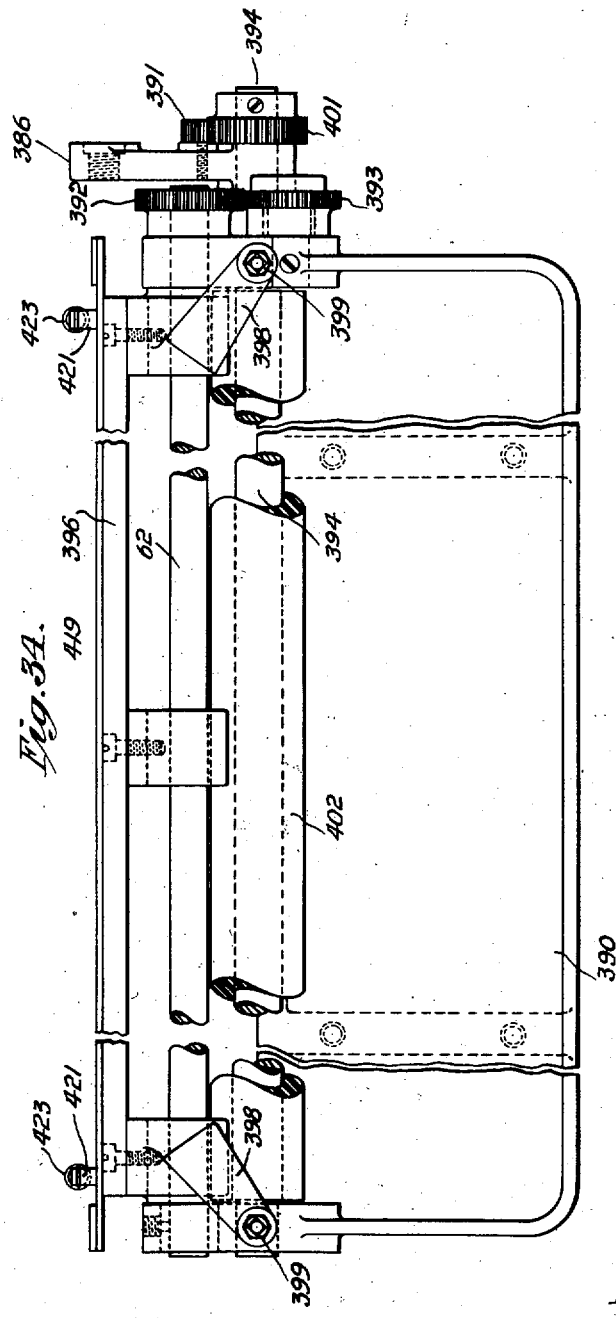
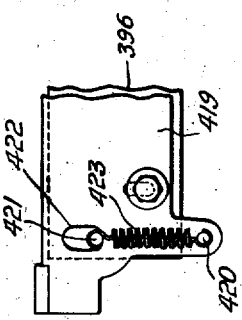
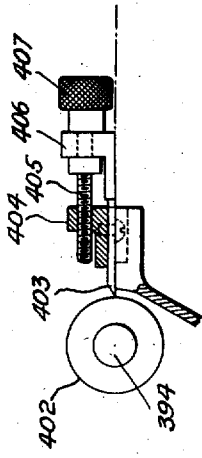
Harry W. Morgan
INVENTOR.
BY
ATTORNEY.

Nov. 3, 1942.   H. W. MORGAN   2,301,067
AUTOMATIC LAMINATING MACHINE
Filed May 29, 1940   21 Sheets-Sheet 20

Harry W. Morgan
INVENTOR.
BY
ATTORNEY.

Nov. 3, 1942.                H. W. MORGAN                2,301,067
                      AUTOMATIC LAMINATING MACHINE
                         Filed May 29, 1940        21 Sheets-Sheet 21
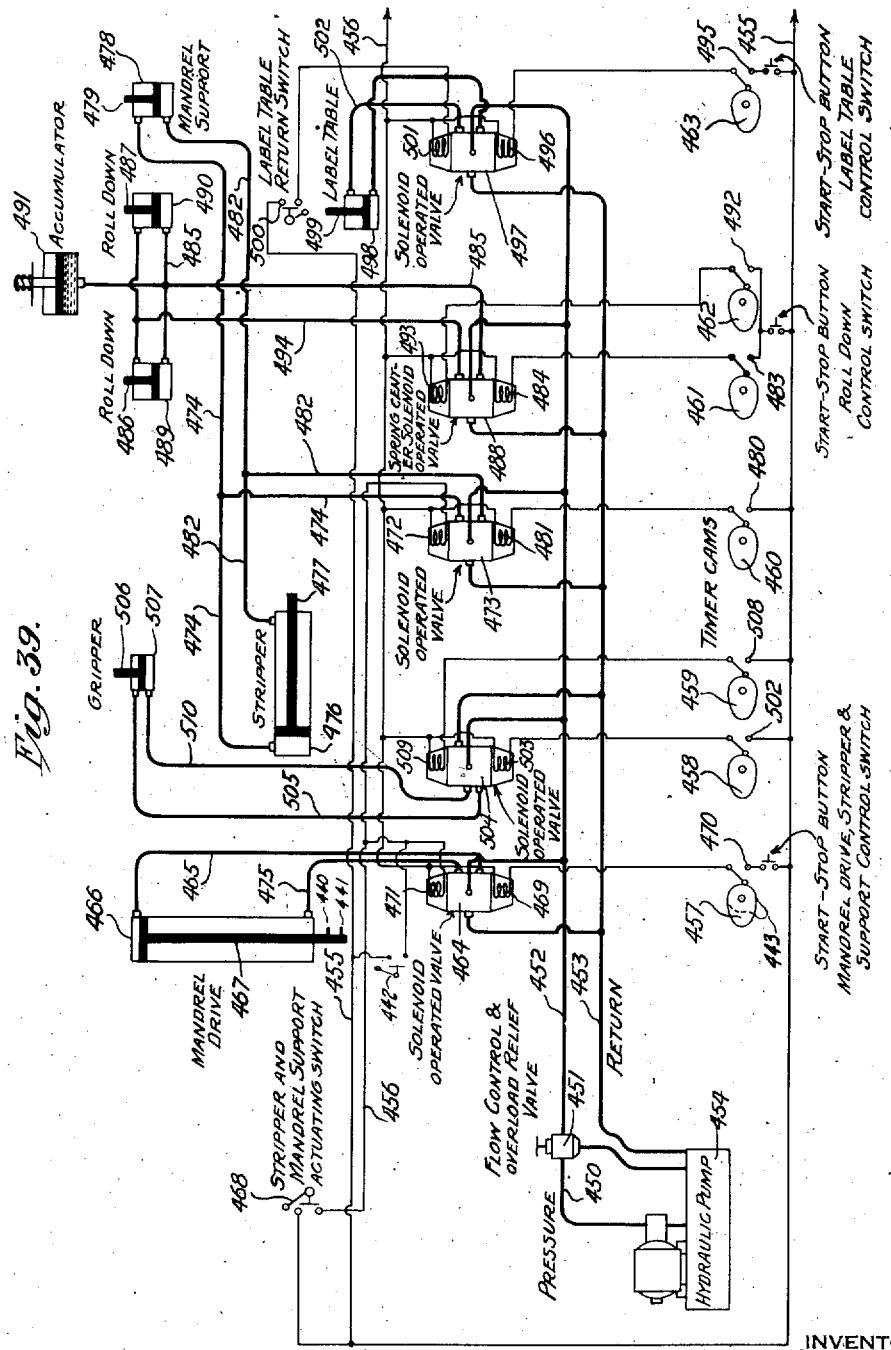

Patented Nov. 3, 1942

2,301,067

UNITED STATES PATENT OFFICE 2,301,067

AUTOMATIC LAMINATING MACHINE

Harry W. Morgan, Phillipsburg, N. J., assignor to The Canister Company, Phillipsburg, N. J., a corporation of New Jersey Application May 29, 1940, Serial No. 338,905

41 Claims. (Cl. 93—81)

The present invention relates to an automatic machine for forming laminated bodies of containers composed of fibrous material including an inner-liner impervious to oil and grease, and having metal end closures.

An important object of the invention is to provide an improved automatic machine for making oil containers that has its work performing parts or units hydraulically operated.

Another object is the provision of a machine of the above character capable of producing greater uniformity in body construction of containers having a cross-section other than cylindrical.

Another object of the invention is the provision of an automatic machine of the present type capable of high speed production and at the same time performing all operations automatically and with a minimum of shrinkage or defective container bodies.

Another object is to provide a laminating machine adapted to be easily and quickly adjusted for making tubular container bodies varying widely in their respective geometry.

Another object is the provision of a machine which performs many operations not performed by prior art machines, is more universal in its adaptability to manufacture different sizes and shapes of container bodies, has a higher rate of production and turns out superior articles of manufacture.

A further object of the invention is the provision of a laminating machine designated for the continuous uninterrupted manufacture of container bodies convolutely wound and comprised of an inner-liner of relatively thin grease and/or oil proof material, a surrounding backing for the oil barrier secured thereto and formed of a plurality of glued-together layers of chip paper stock forming a support for said thin oil barrier and a protective covering for the whole of said backing including one or more windings of moisture proof paper, these several features of construction being accomplished at work stations designed particularly for carrying out a given operation.

Other objects of the invention have to do with constructional features relating to the machine as a whole or the various units thereof; method or manner of operation, flexibility of substituting parts which increase the range of container bodies that may be fabricated, etc., all of which will be apparent from a reading of the following specification.

The automatic machine contemplated by the present invention is designed primarily for the fabrication of laminated container bodies composed of fibrous material and provided with an inner-liner impervious to grease and oil. In fabricating these bodies means are provided for continuously feeding a body sheet of fibrous material such as chip board, or the like, in one direction, and continuously feeding a sheet of inner-liner material, which may be any parchmentized oil proof or oil resistant material, such as glassine, in the opposite direction. The chip stock has one of its surfaces covered throughout its entire length with an adhesive, preferably a vegetable adhesive, and the opposite surface may be intermittently covered with a suitable oil insoluble adhesive for a distance slightly greater than the length of the inner-liner. The body sheet and the inner-liner sheet are provided with cross-wise straight cut edges, and the opposing edges are moved toward each other so that the leading edge of the inner-liner sheet is positioned above and slightly overlap the leading edge of the body sheet, in which position they are pressed together by moving one edge against the other. By this operation an overlap of substantial width is provided and a fold is formed by turning the inner-liner downwardly and backwardly. From this stage the leading edge of the chip functions as a tucker element for the inner-liner in presenting the fold to a gripping member, forming part of the mandrel mechanism.

The inner-liner is the same width as the chip stock and the marginal edges of the two materials are kept in alignment. When the leading edges of the inner-liner and chip have been joined, a measured length of the inner-liner is severed transversely, and the combined sheets of chip and inner-liner are rolled together to enclose the inner-liner and to form a tube. When the desired number of plies of chip have been wound upon the mandrel of the rolling mechanism, the chip is then severed, and a label, preferably composed of waterproof stock, is applied to the exterior of the tube thus formed.

At the time the overlapping edges of the inner-liner and the chip stock are joined, the outer edge of the inner-liner has a side seam of an adhesive applied thereto. The length of the inner-liner being slightly greater than the inside circumference of the tubing provides an overlap for the edges of the inner-liner so that the adhesive for the side seam joins the inner edge of the liner with the outer or adjacent edge thereof, and the adhesive on the outer wall of the inner-liner or adjacent ply of chip, as well as the adhesive on the inner wall of the succeeding or second ply, produces a non-permeable seal at the fold of the inner-liner.

Slitter knives are provided for cutting both the chip and the inner-liner materials into strips of corresponding width slightly in advance of the combining of the leading edge of these materials, for the winding operation. Mechanisms are provided for advancing the rolled down container body from the roll down mandrel to the labelling station, and finally ejecting the container body from the machine.

The foregoing operations are performed by separate or independent units which may be said to comprise work stations although it will be appreciated that the body and inner-liner materials are continuously fed through the machine. These stations may be further characterized as including units which contribute to the work performed at a given station, and the several stations and/or units are properly timed for sequential operation by means of an electro-hydraulic system.

Referring to the accompanying drawings:

Fig. 6 is a longitudinal view, partly in section, of the spindle and gripping mechanism for operating the mandrel and gripper jaws thereof;

Fig. 7 is an end view of the shaft connecting the spindle to the mandrel;

Fig. 8 is a side elevation of the mandrel;

Fig. 9 is a slightly enlarged transverse sectional view taken on the line 9—9 of Fig. 8;

Fig. 10 is a fragmentary isometric view showing the end of the gripper jaw;

Fig. 11 is an elevation of the clutch device taken along the line 11—11 of Fig. 2;

Fig. 12 is a side elevation of the mandrel supporting means;

Fig. 13 is an elevational view on the lines 13—13 of Fig. 12, showing the adjustment of the mandrel support;

Fig. 14 is a top elevation partly in section, of the mandrel supporting mechanism;

Fig. 15 is a side elevation of Fig. 14;

Fig. 17 is a side elevation of the end of the clutch construction controlling the inner-liner feed mechanism;

Fig. 18 is a fragmentary end elevation, partly in section, showing the inner-liner cutter mechanism;

Fig. 19 is an enlarged fragmentary side elevation of the glueing unit, and associated parts, for applying a strip of glue along the folded edge of the combined sheet materials;

Fig. 20 is a plan elevation of the feed table actuating mechanism;

Fig. 21 is a side elevation of Fig. 20;

Fig. 22 is a side elevation of the continuous feeding glue unit;

Fig. 23 is a fragmentary top elevation of the paper driving mechanism;

Fig. 24 is a side elevation showing the suspension for the glue pan;

Fig. 25 is a transverse section taken on the line 25—25 of Fig. 22 showing the sliding gears for change of speed of driving the glue rolls;

Fig. 26 is a sectional view on the line 26—26 of Fig. 22 illustrating the clutch driving mechanism for the glue rolls;

Fig. 27 is a side elevation of the intermittent feeding glueing mechanism;

Fig. 28 is a side elevation of the suspension of the glue pan for the intermittent feeding glue unit;

Fig. 29 is a plan elevation, partly in section, showing the intermittent controlling cam device for regulating the intermittent application of glue;

Fig. 30 is a side elevation of the can body and label roll down mechanism;

Fig. 31 is a fragmentary side elevation, partly in section, of the stripper mechanism;

Fig. 32 is a vertical section taken on the line 32—32 of Fig. 31;

Fig. 34 is a top elevation of the label glue fountain;

Fig. 35 is an end view, partly in section, of the knife adjusting device for regulating the amount of applied glue;

Fig. 36 is a fragmentary front elevation of the label stripping bar;

Fig. 39 is a schematic arrangement of the electro-hydraulic system for operating and controlling the various units of the machine; and Fig. 40 is a schematic illustration of the mandrel shown in different positions with respect to the feeding table for the body materials.

The present invention will probably be best understood by describing the several units for performing the various stages of the work, and these units will be taken up in the sequence in which they function, as nearly as the same is practical or convenient to do so. Following this detail description by a general description of the entire machine, schematically illustrated, will convey a full and easily understandable disclosure of the invention.

Mandrel actuating mechanisms

The mechanisms for actuating the mandrel may be regarded as a chain of devices independent of one another but interrelated so as to produce a result or effect which constitutes the initial stage in fabricating the laminated container body. Therefore a previous conception of general relation and sequence of operation of these several devices may be helpful in appreciating the method of operation and construction of the several structures employed at this stage.

Broadly speaking a selective transmission gear system is driven by a ratchet type clutch actuated by a rack mechanism hydraulically operated. The gear system drives a spline shaft, connected by a flexible coupling to a spindle, which latter operates a gripper mechanism housed in a mandrel. The mandrel construction is such that it may be easily and quickly replaced by another, the gripper forming a part of the mandrel unit and removable therewith. With this general understanding of the mandrel actuating mechanisms, the several units will now be described in detail.

Selective transmission system

Figure 2:
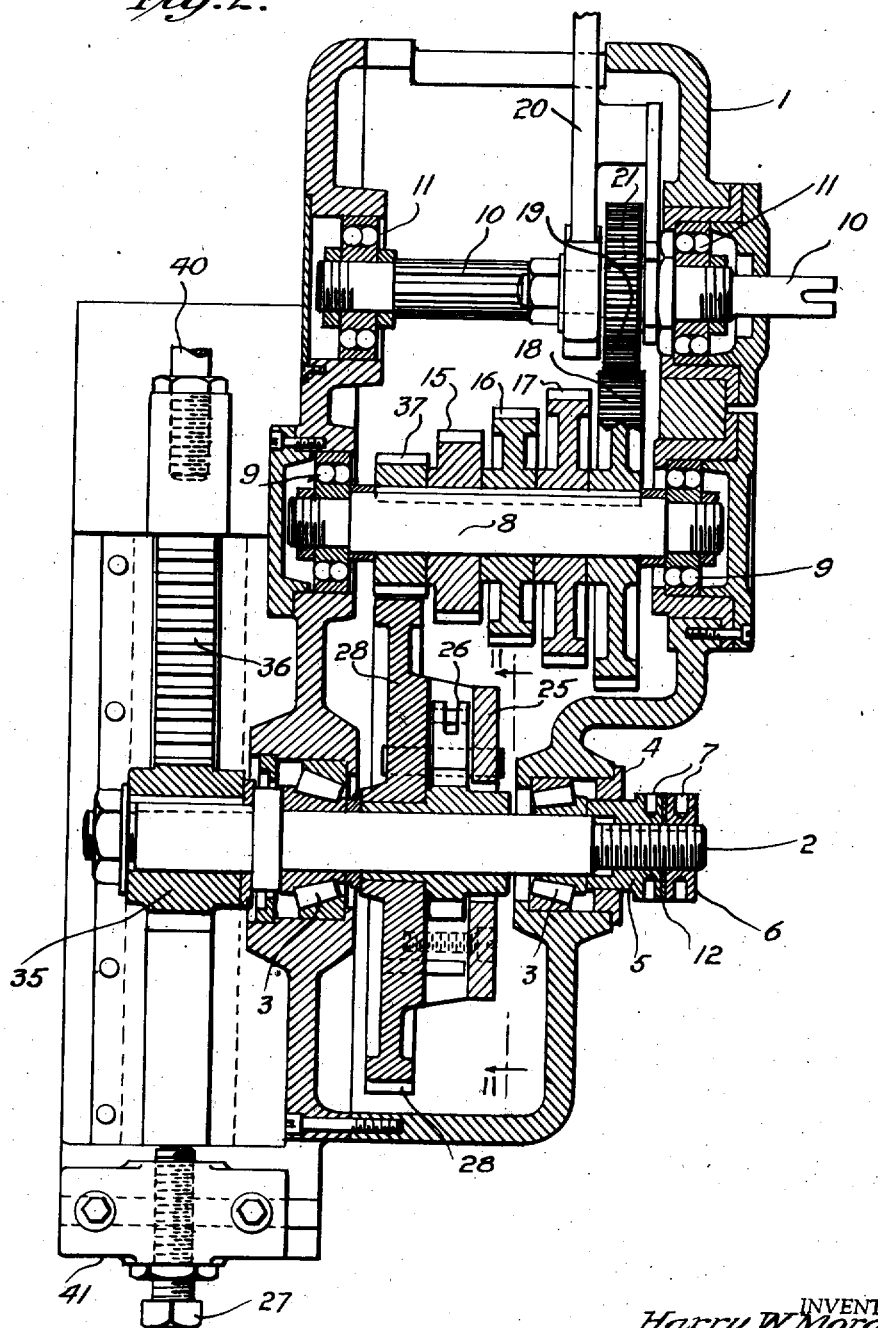
Fig. 2 is a vertical section of the selective transmission system for actuating the mandrel.

Referring to Fig. 2, a selective transmission gear system is mounted in a housing 1 of any suitable construction and having bearings for the various shafts mounted therein. A shaft 2 is mounted in the lower part of the housing 1 by means of conventional roller bearings 3 provided with the customary oil seals including plates 4. The adjustment of the shaft 2 in the bearings 3, for proper clearances, is accomplished by means of an adjusting nut 5, held rigid by a lock nut 6. The nuts 5 and 6 may be adjusted by a spanner wrench engaging radially disposed holes 7. A lock washer 12 is interposed between the adjusting nut 5 and the lock nut 6 to prevent the turning of the former when setting the latter.

Figure 3:
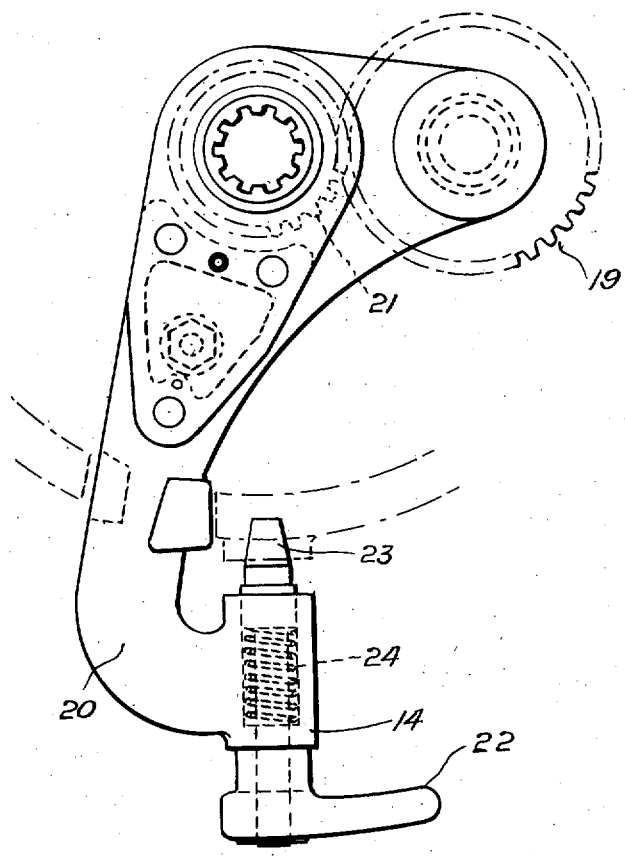
Fig. 3 is a side elevation of the shifting lever for manipulating the gears of the transmission system.
Figure 4:
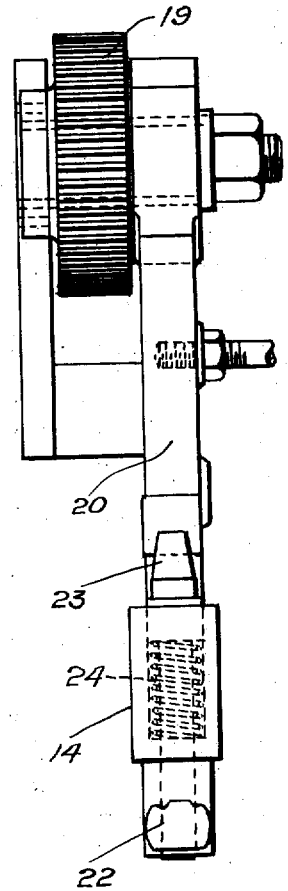
Fig. 4 is an end elevation of the lever shown in Fig. 3.
Figure 5:
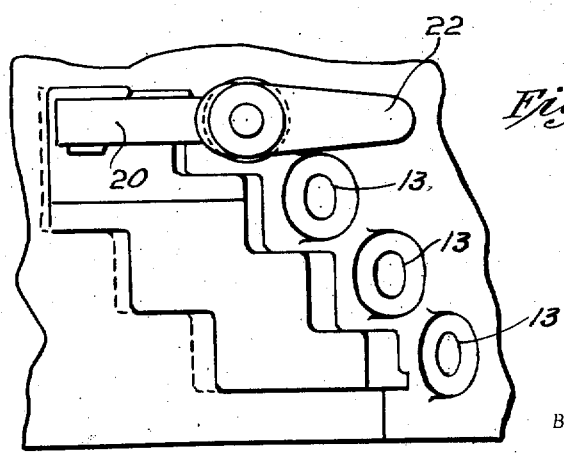
Fig. 5 is a fragmentary top elevation of the transmission housing, showing the different shifting positions for the gear shift lever.

Mounted above the shaft 2 is a jack shaft 8, which is journaled in the housing 1, by means of any conventional type of ball bearings 9 suitably mounted and lubricated. Juxtaposed to the shaft 8 is a spline shaft 10 which is similarly mounted by ball bearings 11. The jack shaft 8 carries a series of gears 15, 16, 17 and 18, having different pitch diameters, which are keyed to the shaft 8, said gears being selectively connected through an idler gear 19 (see Fig. 3), carried on a gear shift lever 20, to a pinion gear 21 secured to the spline shaft 10. The system of gears just described is commonly referred to as quick change gears and the shifting from one gear to another of the gears 15 to 18 is done by operating the gear shift lever 20 through manipulating the handle 22. As is well understood by those skilled in the art, the shifting of these gears is accomplished by a lateral movement of the gear shift lever 20 along the shaft 10 and in a step-by-step or cascading fashion so as to bring the respective gears 15 to 18 inclusive into mesh with the idler gear 19. In accomplishing this movement or shifting of these gears the handle 22, which is of a spring actuated plunger type, is pulled outwardly so that the tapered end 23 is disengaged, which end normally comprises a latch when in engagement with correspondingly tapered holes (see Fig. 5) of the housing 1. As this form of gear system, and shift lever for controlling the same, is well understood by those skilled in the art, there is no necessity of a detailed description of the operation of this mechanism. Suffice it to say that the gear shift lever 20 slidably reciprocates transversely in the housing 1 on the shaft 10, and the meshing of the gears 15 to 18 either in reduced or increased ratio is effected by a rotary motion of the lever 20, produced by operating the handle 22, i. e. pulling it outwardly and moving it upwardly or downwardly. When a particular one of the gears 15 to 18 has been selected, under the action of a compression spring 24 mounted in a longitudinal recess in the bearing 14 supporting the handle 22, the tapered end 23 engages one of the holes 13 cooperatively positioned with the preselected gear so that the shift lever 20 is thus locked in the desired position.

Returning to shaft 2, it will be noted that a ratchet mechanism comprising a ratchet member 25 (see Figs. 2 and 11) keyed to the shaft 2, is engaged by pawls 26, which latter acts as a connection between the ratchet 25 and the gear 28. It will be noted that the ratchet 25 consists of two eccentric surfaces extending through 180 degrees and terminating in shoulders forming two teeth 29 with their active surfaces diametrically disposed. The pawls 26 are normally maintained in contact with the ratchet 25 by coil springs 30 having one of their ends anchored on the gear 28 and their other ends secured to ears 31 forming part of the pawls 26. The use of two pawls 26 balances the movement of the shaft 2.

Secured to the extremity of the shaft 2 is a pinion gear 35 which is in contact with a rack 36. The rack 36 is hydraulically operated in a manner to be described hereinafter. The downward movement of the rack 36 is translated through the pinion gear 35, to shaft 2, ratchet 25, and pawls 26, causing the shaft 2 to rotate 180 degrees in a clockwise direction. This rotation of the shaft 2 effects the rotation of the gear 28, which in turn is transmitted to mating gear 37 secured to the shaft 8, thereby rotating the latter.

The ratio of the gear 28 to the gear 37 is such that it will rotate the shaft 8 twice in one cycle. It is obvious that this ratio may be changed at will. The rotation of shaft 8, through the idler gear 19, rotates the gears 15, 16, 17 and 18. The ratio of these gears to pinion gear 21 slideably mounted on the shaft 10, is such that the shaft 10 is rotated 3, 4, 5 or 6 turns per cycle, depending upon the setting of the gear shift lever 20. As will be understood later in the description, the number of turns the shaft 10 is caused to make depends upon the number of plies or layers of which the container body is formed.

The return stroke of the rack 36 is an idle stroke so far as producing any work is concerned; that is to say the shaft 2 is rotated in a counter-clockwise direction which effects the disengagement of the pawls 26 from the ratchet teeth 29.

It is important that the shaft 10 is held in proper position with respect to gear centers while changing from one gear to another so that the gripper jaw in the mandrel, to be described hereinafter, will always be in a vertical plane. To accomplish this the rack 36 in its downward movement has a slight over travel which is regulated by adjusting screw 27 to provide the proper stroke of the rack 36.

The mechanism for operating the rack 36 comprises a hydraulic mechanism, not shown except schematically on Fig. 39. Essentially it consists of a cylindrical chamber having a piston 40 reciprocally mounted therein and carrying on its outer end the rack 36 which, as previously explained, is operatively positioned with respect to pinion gear 35. As mentioned above, the downward stroke of the rack 36 is regulated by the adjusting screw 27 mounted within a suitable bearing 41.

Spindle mechanism

The spline shaft 10 is provided with a slot for making connection with a flexible coupling unit 42 which may be of any conventional type. In the present instance the coupling consists of two collar members provided with transversely arranged recesses 43 adapted to accommodate connecting elements 44 and 45. Set screws 46 retain the coupling 42 in position on the shaft 10 and a spindle 47. The spindle 47 is supported by roller bearings 48 and 49 mounted on the machine frame. The bearings 48 and 49 are of the same general construction as the bearing for the shaft 2, consisting of an adjustable collar 50, a lock nut 51 and a lock washer 52 interposed between the flange of the collar 50 and the lock nut 51. The purpose of the collar 50 is to provide proper clearance.

Adjacent the outer face of the bearing 49 is a flange 53 secured to the spindle 47 by means of a key 54 and a lock nut 55. The flange 53 and the end of the spindle 47 are adapted for engagement with a mating flange 56 (shown in dotted lines, Fig. 6) carried by a mandrel hereinafter to be described. Intermediate of the bearings 48 and 49 is inserted a journal construction comprising a bushing 57 slideable on the spindle 47. Pinned to the spindle 47 as by means of a set screw 58, is a collar member 59 having a reduced portion adapted to be surrounded by one end of a compression spring 60. The opposite end of the spring 60 is seated against an abutment formed on a reduced portion of the collar 57. The spring 60 is normally under compression and functions to move the collar 57 forwardly (i. e. to the right of Fig. 6) under conditions presently described.

A gripper actuating rod 62 is rotatably mounted within the spindle 47 and is adapted to be actuated as follows. A sliding motion (in a right hand direction of Fig. 6) of the collar 57 effects a partial rotation of the gripper rod 62 by virtue of a diagonal cam slot 63 provided in the collar 57, which slot engages a roller 64 and thus effects a radial movement of the gripper rod 62 during the forward motion of the collar 57 under the tension of compression spring 60. By this arrangement of actuating the gripper rod 62, spring tension is applied to the end of the paper inserted in a mandrel later described. It may be noted here that with the roller 64, shown in the position on the drawings, a gripper element actuated by the rod 62 is in open position as will hereinafter be apparent.

The reverse longitudinal movement of the bushing 57 is effected by a linkage mechanism designated generally by the reference character 65, which mechanism may include a lever 66 having a shoe 67 at its free end which is adapted to slide in a groove 61 formed in a collar 68 floating on the bushing 57. The lower end of the lever 66 is pivoted in a suitable bracket and may be integral with or connected to a lever 69, the outer end of which is connected by a link 70 to a slide 71, the latter being screw threadedly attached to a piston rod 72 operated by a hydraulic cylinder 73. From the above it is obvious that the closing of the gripper jaw is effected by the rotation of the gripper rod 62 under the tension of the spring 60, and that the opening of the gripper jaw is effected through the linkage 65 hydraulically operated to slide the collar 57 backwardly, which movement releases the gripper and places the spring 60 under further compression.

Mandrel and gripper mechanism

Referring to Figs. 8 to 10, it will be noted that the flange 56 is part of a hollow mandrel 80 for forming the container body, and suitable connection between the gripper rod 74 (see Fig. 6) and the gripper actuating rod 82 is effected by a clutch arrangement comprising inter-locking teeth 81 (shown in Fig. 7) formed on the end of the gripper rod 74 and the gripper actuating rod 82.

The gripper actuating rod 82 has a longitudinal projection 83 which is accommodated in a correspondingly shaped recess 84 formed in an upper gripper jaw 85. The gripper jaw 85 is rotatably mounted in bearings located on each end of the gripper housing 86. The gripper housing 86 is secured within the mandrel 80 by means of screws 87, and may be removed from the mandrel 80 as a unit by unfastening the screws 87.

It will be noted that the gripper jaw 85 is provided with a longitudinal slot 88, the lower edge of which is provided with spaced transverse slots 77 forming an interrupted ledge 78 having teeth 79, which teeth return the lapped or gripped edge of the paper stock to the inner wall of the container body, as will be apparent from the following description. The lower jaw 90 is in a fixed position, and is correspondingly recessed, producing teeth 76 in staggered relation to the teeth 79 formed in the upper jaw 85, which arrangement permits the teeth 76 and 79 to interlock by a rotary motion of the jaw 85. It may be mentioned that the plane of the teeth 76 passes through the center of the jaw 85, and when the latter is rotated to gripping position the gripping surface of the jaw 85 is parallel with the surface of the teeth 78, thus insuring substantial surface area for gripping the paper stock when inserted between these gripper elements.

With the release of the gripper jaw 85, it is rotated upwardly during which operation the teeth 79 contact the folded edge of the paper stock, and as the rotation of the jaw 85 continues, this inwardly projecting edge is rolled smoothly against the inner adjacent surface of the can body.

An important feature of construction of the gripper jaw 85 resides in having a portion 75 of the periphery thereof eccentric to the fulcrum point formed by the bearings of the jaw 85, the radius of the eccentric portion being large enough to cause a protrusion thereof through an aperture or longitudinal slot 91 formed in the gripper housing 86. This protruding portion 75, when the jaw 85 is in closed position, serves as a ridge which slightly enlarges the contour of the mandrel 80, thus affording a sufficient clearance for the paper stock during the winding operation to make it easy to remove the formed container body, upon retraction or opening of the gripper jaw 85.

Mandrel supporting device

The free end of the mandrel 80 has a central projecting plug 92 which engages with a movable tail stock mechanism designated generally by the numeral 93, supported on an adjustable pedestal 94 forming part of the machine bed. The reason for having the pedestal 94 movable longitudinally of the machine bed is to permit adjustments for accommodating mandrels varying in length.

The tail stock mechanism 93 is capable of movement longitudinally of the machine bed and swings upwardly in an arc to clear the mandrel. The longitudinal movement of the tail stock is produced by a slide mechanism 95 and the arcuate movement is produced by a slide member 96.

Assuming the tail stock 93 to be in engagement with the mandrel 80 (see Fig. 14), the first movement is away from the mandrel, which movement is produced by a cam roller 97 carried upon a bracket 97' mounted on the slide 98, traveling in a slot 100 provided in the slide 99. The arcuate movement of the tail stock 93 is effected by the continued downward movement of the slide 99, which at this phase involves a compound movement of the slides 98 and 99 produced by the roller 97 becoming locked in slot 100. That is to say, the extreme downward movement of the slide 99 in a vertical direction, causes the tail stock 93 to move to the right in Fig. 15, and when the roller 97 reaches the end of the slot 100, further longitudinal movement of the tail stock 93 is arrested, and any continued movement of the slide 99 is transformed into an arcuate movement of the tail stock 93.

A continuation of the downward movement of slide 99 actuates a connecting link 101 which is attached to a support head 102 and thus rotates the latter in an arc above the mandrel 80. This operation is accomplished by a direct connection of the slide 99 to a piston rod 103 of a hydraulic cylinder. The downward motion of the mandrel support head 102, to the above assumed position, strikes off any can bodies which may be projecting beyond mandrel plug 92, so that they will not otherwise be damaged.

The tail stock 93 in returning into engagement with the mandrel 80, engages center pin 104 with plug 92 and at the same time a pilot pin 105 carried on the mandrel support head 102 (see Figs. 12 and 15) is engaged in bushing 106 of a support bracket 107. This forms a rigid connection between the fulcrum pin 108 and the pilot pin 105 so that stresses on the free end of the mandrel 80 are absorbed by these members.

Center pin 104 is reciprocally mounted in the housing 108' of mandrel support head 102 and is supported by a spring backed thrust bearing 109. The pin 104 is mounted in the head 102 by a set of bearings 110 and 111; the forward bearing 110 is a ball bearing and the rear bearing is plain, and intermediate these bearings is a compression spring 112.

The connecting link 101 is provided at its lower end with a slot 122 (see Fig. 12) through which extends a stud 113 mounted on a bracket 116 carried by the slide 99. To the projecting end of the stud 113 is connected one end of a tension spring 114, the other end of which is fastened to a stud 115 carried at the extreme end of the link 101. This construction forms a sliding connection between link 101 and the slide mechanism 96 so that there is freedom of longitudinal movement between the slide mechanism 96 and the slide mechanism 95 to which the upper end of the connecting link 101 is fastened. It should be noted that the length of the slot 122 corresponds to the inclined lower half of the slot 100 of the slide 99. The function of the slot 122 is to permit a downward vertical motion of the slide 99 during the time of the longitudinal motion of the slide mechanism 95, which motion takes place before the slide mechanisms 95 and 99 become locked together by engagement of the roll 97 in the upper straight portion of the slot 100.

With variations in the length of the mandrel 80 it is necessary to provide an adjustment of the pedestal 94 with respect to the longitudinal axis of the mandrel so as to properly position the pin 104 for engagement with the plug 92 on the mandrel 80. Such an adjusting mechanism may comprise an adjusting screw 118, extending through a bearing 119 and having a flange 120 abutting against the outer shoulder of the bearing 119. The bearing 119 forms part of a bracket 117 which may be integral with a base 124. On the inner shoulder of the bearing 119 there is mounted a collar 123 fastened to the adjusting screw 118 by a set screw 125. The bottom of the pedestal 94 is provided with a threaded block 121 having mating threads for accommodating the threads of the adjusting screw 118. The foot of the pedestal 94 is slideably mounted on the base 124 and is held in place by a gib 305 attached by cap screws 306.

Flap shearing and winding mechanism

An important feature of the mandrel actuating structure is the provision of means for rolling down the flap which remains after the portion of the chip stock has been severed from the continuous sheet thereof. This flap extends from the edge of the table 259, where it has been severed by the knife 270, to the mandrel in its stop or non-rotating position. According to present practices the partly formed container is stripped or moved along the mandrel to a position opposite the labeling table where the leading edge of the label is brought in contact with the incompletely wound container body and the flap is pressed against the side of the container during the application of the label.

There are several objections to rolling down the flap in this manner. For example there is an appreciable time between the cutting operation during which the flap is formed and the stripping of the incompletely formed container body along the mandrel so as to bring it in position with the label table. This permits an appreciable drying of the glue on the exposed portion of the flap. Furthermore, when the flap is rolled down as part of the labeling operation it does not form as tightly a fabricated container body as if the flap were completely rolled down before the container body is transferred to the labeling position. A still further objection is that the seam or joint formed by the edge of the body material is more pronounced than if it were completely rolled down in one forming operation. It is also obvious that according to present practices it is impossible to match or line up the joint formed by the overlapping edges of the label and the joint formed along the container body by the edge of the body material.

The machine contemplated by the present invention overcomes these difficulties by completely rolling down the container body before advancing it to the labeling position. This is accomplished by providing means for momentarily stopping the rotation of the mandrel before it has completed the required number of turns in order to wind the desired number of plies or layers of the body material. Referring to Fig. 40, the table 259 and the mandrel 80 are shown schematically relatively positioned with respect to each other. The mandrel 80, as shown in heavy lines, represents the normal or "neutral" position of where it would be stopped in accordance with present practices. In that position the gripper jaws would be open and the container body positioned for sliding along the mandrel by the stripper to the labeling position. However, as contemplated by the present invention, the mandrel 80 is first stopped either in position number 1 or position number 2, as shown in phantom or dotted line. In position number 1 it will be seen that the flap is shorter than it would be if the cutting operation was performed at the time the mandrel were in "neutral" position which may be understood as being the position in which the gripper jaws are opened and the container body is partly stripped or moved along the mandrel. On the other hand when the mandrel is stopped in position number 2 the flap is longer than the flap formed with the mandrel in "neutral" position.

It is therefore necessary, according to the present invention, to provide for an additional turn of the mandrel 80, with a plus or minus fraction of a complete turn over the number of plies of which it is desired to form the container body. That is to say if the container body is to be made of five plies, the mandrel is stopped either in position number 1 or number 2 of Fig. 40, depending upon whether the overlap is desired to be shorter or longer than the overlap obtained when the mandrel is in "neutral" position. In the case of a short overlap, i. e. one which is slightly less than five complete plies, the mandrel may be stopped at approximately 4¾ turns (indicated by position number 1) and then the chip stock is severed after which the mandrel is again rotated for 1¼ turns, making a total of 6 turns in order to produce a completely formed and/or rolled down container body before transferring it to the labeling position.

If a longer overlap, i. e. one slightly in excess of five plies is desired, the mandrel is stopped after having completed approximately 5¼ turns as indicated in position number 2. The chip stock is then severed and the mandrel rotated for ¾ of a turn, making a total of 6 turns to complete fully the roll down operation. It should be appreciated that the mandrel is always finally brought to its "neutral" position, irrespective of the cross section of the mandrel, in order to permit the opening of the gripper jaws and the insertion of the folded edges of the chip stock and inner-liner, which operations occur in timed relation with the other units of the machine, as fully set forth herein and described more particularly in connection with the electro-hydraulic system for controlling the various units.

Continuous feeding glue unit

The body stock roll A is supported on oppositely disposed brackets 126 (see Fig. 22) supported on the machine bed frame. The paper normally contacts guide roller 127 until the diameter of the roll of body stock diminishes to a point where the paper becomes tangent to the guide roll 128'. The chip A is then led under roll 128, over roller 129, under roll 137, over matrix roll 131 and under roll 139. The paper is kept in contact with the glue matrix roll 131 by rolls 137 and 139. Rolls 131, 137 and 139 are mounted in a frame 132 hinged on fulcrum point 133. The frame 132 is held in position over the paper by adjusting screws 134. The reason for thus mounting the rolls is so that the entire frame can be hinged back to a position which facilitates cleaning of the roll 131. The extreme upward position of the frame 132 is limited by the stop 135 engaging the rest 136. Mounted on a shaft 142, is a glue feed roll 130 and a gear 140, the gear 140 meshing with a pinion gear 141, which gears drive the feed roll 130 in a clockwise direction. On shaft 143 of matrix roll 131, a gear 144 is meshed with the gear 140, driving it in a counter-clockwise direction. The roll 131 has sufficient clearance between the opposing surface of feed roll 130 to allow the deposit of a thin smooth film of glue thereon which is applied to the roll 131, which latter roll applies this film of glue to the paper A as it travels over the top of roll 131, held thereon by rolls 137 and 139.

The paper continues with an under surface coating and is brought around roll 138 so that the surface having the glue is then on the top. The roll 130 is driven by a gear transmission (see Fig. 25) including a sprocket 145. Sprocket 146, driven by the sprocket 145, is mounted on a bushing 147, which is in turn mounted on a stud 148. Carried on the left end of bushing 147 is an integral slide gear 149 operatively positioned with a gear 150 which drives the roll 130. The gear 149 is slidable on the bushing 147, by manipulating the knob 96, to a position so that the gear teeth 151 mesh with the gear teeth 152, which increases the speed of the gear 150, and thus affords a quick variable speed arrangement for driving the glue feed roll 130. The gears 149 and 151 are locked in place by a ball spring latch 97 engaging notches 98 on the sleeve 147.

Another variable speed mechanism is also provided for driving the above mentioned glue rolls, which includes a clutch and variable speed driving members. The driving members may comprise variable speed conical rolls 155 and 156 (see Figs. 23 and 24). These rolls 155 and 156 are changeable in speed through belt 157 by shifting the belt housing 158. The belt housing 158 is slideably mounted on a rod 153, and is adjusted on the rod 153 by a screw 154. These conical rolls with driving belt are a conventional form of change speed drive and therefore require no detail description.

Mounted on the same shaft 165 as conical roll 155 is a clutch mechanism, referred to generally as 160 (see Fig. 26), comprising a disc 161 having a flange which seats a disc 162 provided with a friction surface adapted to contact the opposing surface of the disc 161. The purpose of the clutch 160 is to maintain the uniform feeding of the paper. The disc 161 is driven through bevel gear 163 by bevel pinion 164. The bevel gear 163 rotates on shaft 165 and is pinned to the disc 161, which with friction disc 162, completes the connection between the driving gears 163 and 164 and the shaft 165. The shaft 166 is a constant speed shaft, which drives pinion gear 164, thus causing the disc 161 to float. The frictional contact between the discs 161 and 162 is regulated by a compression spring 167 having its ends bearing on washers 168 and 169 located on the shaft 165. The tension in the spring 167 is adjustable by means of a nut 170.

Referring for the moment to Fig. 22, the movement of a lever 171, fulcrumed on a rod 172, is obtained by connection of a link 173 to a lever 174 fulcrumed in a bracket 175. The short arm of the lever 174 is attached to a connecting rod 176, which controls the clutch plate 162 through connecting yoke 177 (see Fig. 26), the latter being mounted on the bracket 178.

Again referring to Fig. 22, it will be seen on lever 171 is fixed a flange 179 which has a radial slot 180 for adjustment of the lever 174 through the link 173 by means of fulcrum point 181 comprised of clamping bolt and nut adapted to be adjusted in the radial slot 180, which effects the raising or lowering of a dance roll 182 on the lever 171. The paper continues under dance roll 182, over guide roll 183 (see Fig. 1), under guide roll 185, over matrix roll 184 and under guide roll 186.

The suspension of the tank for the present glueing unit may be described as follows. Referring to Fig. 24, a glue tank 199 is supported by pivots 200 and 201 carried thereon and engaging notches 202 and 203 formed in the ends of levers 204 and 205. The levers 204 and 205 are supported on shafts 206 and 207 and connected by a link 208, forming a parallel movement when actuated by a handle 209. The construction just described forms a suspension for the tank 199 so that it may be lowered by the operation of lever 209 fulcrumed on the shaft 207 in moving the lever 209 to the left in an arcuate motion. This clears the tank 199 from the glue roll 130. This construction permits the ready removal of the tank 199 for cleaning purposes without disturbing the glue roll 130. Handle 209 is held in a vertical position by a latch 210 mounted on a bracket 211 and contacting pin 212 mounted in handle 209. By pressing plunger 213 the pin 212 is freed of the latch 210, allowing the handle 209 to be moved to the left. The structure just described for lowering forms part of the continuous glue unit.

Intermittent gluing unit

Rolls 184, 185 and 186 intermittently apply glue to the under surface of the chip A. They are supported on the frame 187 (see Fig. 27), which is actuated by a cam lever 188, which in turn is operated through a cam roller 189 in contact with an adjustable surface cam 190. The surface of cam 190, in contact with roller 189 has an adjustable slide plate 191, by which plate adjustment is made to suit the length of the glue intermittently applied to the paper stock. The adjustment of the plate 191 is effected radially by means of clamp screws 192, in slots 193 in the cam 190. The drive for the cam 190 constitutes a worm 214 (see Fig. 29) and gear 215, i. e. the worm 214 being constantly driven. Bearing supports 194 mount the roll 195, which is normally maintained in place by swivel clamp 196.

The general construction of the mounting of these rolls 184, 185 and 186 in the frame 187 is of the same general type as in connection with the frame 132 described in connection with the continuous glueing unit. However, as is obvious from the above, the present construction merely applies glue intermittently to the opposite surface of the paper stock.

Referring to Fig. 28, the tank 216 is supported by flexible metal cable 217 attached by clamps 218 to the tank support 219. Sufficient length of the flexible cable 217 is wound around spools 220 and 221 to allow for dropping the tank 216 to a position 228 where it may be easily removed. The spools 220 and 221 are connected by a chain 222 to sprockets 223 and 224 forming part of the spools 220 and 221. In lowering the tank 216, ratchet 225 mounted on a shaft 226 and held in position by a pawl 227, is turned in a clockwise direction after raising the pawl 227 clear of the ratchet 225. The weight of the tank automatically unwinds the cable 217 from the spools 220 and 221, thus permitting the tank to rest in the position 228 on the base of the machine. The uniform unwinding of the spools 220 and 221 is accomplished because of the direct connection of the sprocket chain 222 with the sprockets 223 and 224, i. e. neither of these spools are premitted to run ahead of the other.

Inner-liner feeding and combining mechanism

A roll of inner-liner material B is suitably mounted on supporting brackets 230. These brackets have means for adjusting the inner-liner transversely, to align it with respect to the chip board A. It may be noted that the chip A is supported in a similar manner. In that way the inner-liner and body stock materials can be lined up with respect to each other and the mandrel 80, as will hereinafter be appreciated.

The inner-liner passes between feed rolls 231 and 232 and under dance roll 233. The ends of the roll 231 are mounted in trunnions held under spring pressure and the trunnions are counter-balanced by levers 234 connected by a cross rod, which rod carries an adjustable weight 235. By moving the weight 235 lengthwise of the cross rod, the pressure on the respective trunnions can be counter-balanced so as to keep the feed roll 231 in a level position when the full width of the roll is not used, i. e. when the inner-liner is narrower than the roll 231. The dance roll 233 is mounted on supports 236, and when the dance roll has reached its lowest position, the supports 236 contact a micro-switch 237, which effects the energization of a solenoid 239 (see Fig. 17). A flexible cable 240 connects the plunger of the solenoid 239 with a clutch lever 241 which is pivoted on a bracket 242. The lever 241 is connected by means of pin 243 to a clutch 244 slideably mounted on a shaft 238. The feed rolls 231 and 232 are rotated through mating gears 245 and 246, the gear 245 being mounted on the shaft 238. A sprocket 247 floats on the shaft 238 and is adapted to be engaged and disengaged by the clutch 244. The disengagement of the clutch 244 momentarily stops the rotation of the feed rolls 231 and 232 which temporarily prevents the continued feeding of the inner-liner B during this period. It will be appreciated, however, that this arrangement is primarily a safety feature which is seldom utilized, because the dance roll 233 in moving up and down normally takes care of any slack caused by the periodic arresting of the feeding of the inner-liner during the shearing thereof into predetermined lengths.

The inner-liner, after passing under the dance roll 233 continues over roll 248, which roll, rotating at a relatively higher speed than the movement of the inner-liner, normally assists in the delivery or forward motion of the inner-liner. The function of the roll 248 is especially advantageous during the time the feed table 259 is moving upwardly and also during the initial rotation of the mandrel 80, i. e. until the inner-liner is severed to a predetermined length, which operations will be described presently. Mounted in advance of the roll 248 is a latch device 249 adapted to engage the inner-liner paper during the shearing thereof and prevent the back slipping of the paper after the same is severed into lengths.

The inner-liner continues through rotary shear or cutter blades 250 and 251 (see Fig. 18), mounted on shafts 252 and 253, which cutter blades sever the paper into several strips, the width of which corresponds to the body length of the containers under fabrication. The cutter blades 250 and 251 are slideably mounted for adjustment as to width or spacing. The inner-liner in its forward movement passes under a guide rod 254 (see Fig. 18), pivotally mounted so as to permit the free rotation thereof.

As will be understood presently, tension produced on the inner-liner lifts the rod 254 and its mounting upwardly. The mounting for the rod 254 is pivoted on shaft 256 and includes a shear blade 255, which blade when carried upwardly by the tension of the inner-liner paper, is brought within striking distance of a mating cutter blade 257. After the cutter blade 255 has been moved within striking position of the cutter blade 257, the blades are actually brought together by tension exerted on the wire cable 306 which has one of its ends attached to a drum connected to the shaft 256 and its other end connected to the plunger of a solenoid 307. The solenoid 307 is controlled by a timing mechanism (not shown) which may be suitably operated in proper sequence as to to bring the cutter blades 255 and 257 into engagement. The engagement of the cutter blades 255 and 257 thus sever the inner-liner into any desired length, which is determined by the circumference of a given container.

Figure 16:
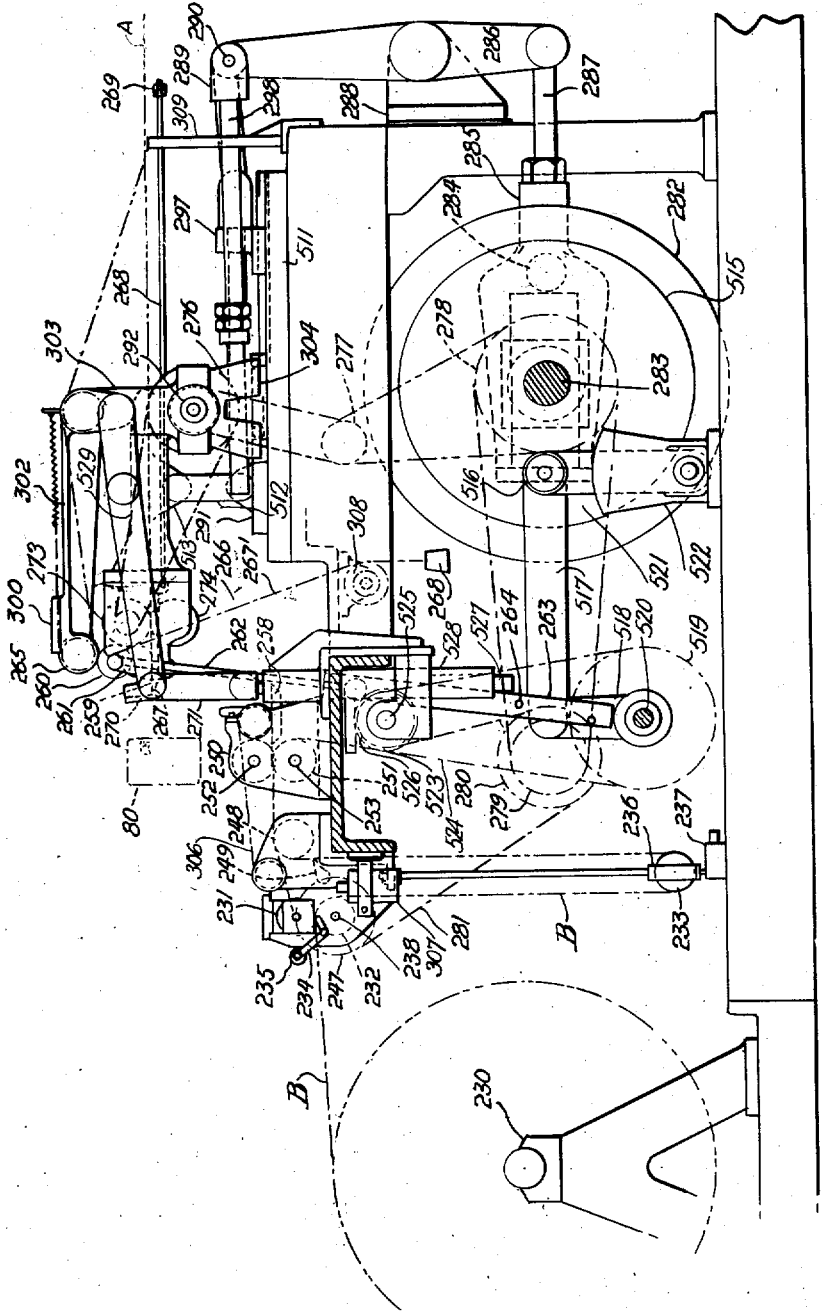
Fig. 16 is a side elevation of the combined inner-liner and chip stock feeding and glueing mechanism.

It should be noted that the inner-liner is held between the guide rod 254 and the shearing blade 255 so that after the inner-liner paper has been sheared and the rod 254 is returned to normal position, the edge of the paper is loosely gripped between the rod 254 and the edge of the shearing blade 255, thus leaving the inner-liner projecting slightly beyond the tip of the inner-liner table 258, and overlying the edge of a feed table 259. The feed table 259 as will be appreciated from the following description, is pivotally mounted so that the free end thereof is capable of an arcuate motion and the table is also adapted to be moved to and fro horizontally so as to present the combined or folded edge of the inner-liner and body stock for insertion into the jaws of the mandrel 80. In Fig. 16 the feed table 259 is shown in an elevated position and retracted from the mandrel 80. However, when the feed table 259 is in a lowered position the tip 267 thereof is in a receptive position for the inner-liner to overlap the leading edge of the body stock A carried by the feed table 259 and the two paper materials are consolidated in the following manner along their margin edges by a glue roll 260.

As noted above, the function of the roll 260 is to consolidate the overlapping edges of the inner-liner and body stock, and simultaneously therewith apply a strip of glue along the top edge of the inner-liner. To accomplish these functions the roll 260 is adapted to swing or oscillate between the edge of the feed table 259 and a fountain glue roll 265.

The roll 260 may be hinged to the feed table 259 by levers 261 (see Fig. 19). It will be understood that the levers 261 are oppositely disposed and suitably pivoted on the feed table 259, the roll 260 being mounted near the free ends of the levers 261 so that the roll 260 is adapted to describe an arc with its pivotal center adjacent the edge of the feed table 259. A piston rod 262 operating in a pneumatic cylinder 263 has its free end attached to the roll 260. The cylinder 263 is pivotally supported on the machine frame, so that in the raising and lowering of the feed table 259, the roll 260 may swing in an arc as shown in dotted lines of Fig. 19.

The oscillation of the roll 260 between the edge of the feed table 259 and the glue roll 265 is effected jointly by the pneumatic cylinder 263, the action of which is supplemented by a roller chain 267' having one of its ends suitably attached to the mounting for the roll 260 and the other end carrying a weight 268'. The roller chain 267' operates over an idler sprocket 308 located beneath the bed of the machine. However it should be noted that the upward movement of the weight 268' is limited by any suitable expedient such as a stop (not shown) or the like, the reason for the same being presently understood. As such an arrangement may be conventional and is well understood, the sprocket 308 is merely shown in phantom in Fig. 16. It should also be noted that as the edge of the table is raised or lowered, the chain 267' and the weight 268' are free to follow such movements because these members are in effect carried by the feed table 259 and therefore move up and down in unison with the edge thereof.

Figure 1:
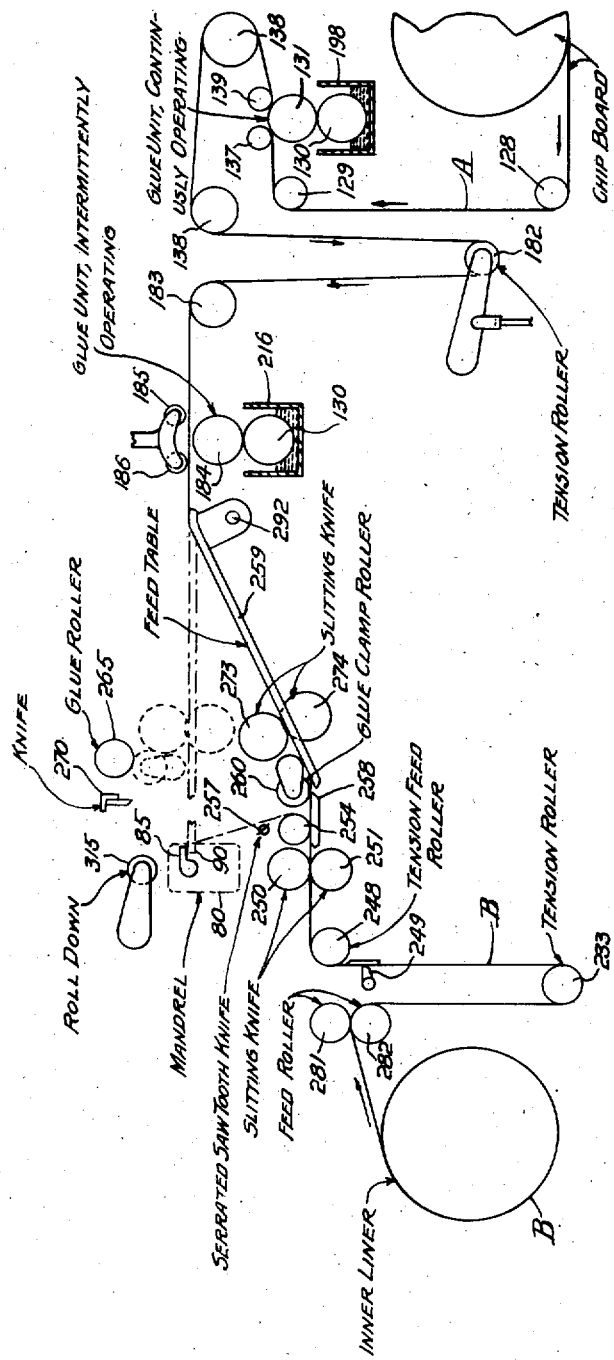
Fig. 1 is a schematic side elevation of the important machine elements employed in fabricating a container body in accordance with the present invention.

As the feed table 259 may be assumed to be in any position, for the sake of convenience in describing the movement of the roll 260, the feed table 259 will be considered as being in the lowermost position. In this position the roll 260 is not in contact with the overlapped edges of the inner-liner and the chip stock because in the lowering of the feed table 259 the roll 260 occupies the relative position with respect to the feed table 259 as is shown in Fig. 19. For the sake of clarity it may be mentioned that when the feed table is in its lowermost position the edge thereof is slightly below the level of the inner-liner table 258 so as to permit the feeding of the inner-liner above or over the adjacent edge of the chip stock. This is schematically shown in Fig. 1.

On the upward movement of the feed table 259 the roll 260 is brought into engagement with the overlapped edges of the inner-liner and the chip stock in the following manner. As the feed table 259 starts its upward movement the piston rod 262 is withdrawn from the cylinder 263, thereby creating a partial vacuum in the cylinder which vacuum exerts sufficient force to oscillate the roll 260 about its pivotal point and bring the roll 260 into positive engagement with the edge of the feed table 259. This partial vacuum is sufficient to cause the roll 260 to maintain a fair degree of pressure against the leading edge of the feed table 259 as it swings upwardly, thereby holding the combined edges of the inner-liner and body stock on the feed table until the latter is moved upwardly to a horizontal position. As the piston rod 262 is being withdrawn from the cylinder 263 the vacuum created thereby may be regulated by a bleeder valve (not shown) so as not to produce too much of a drag on the feed table 259. In order to break the vacuum created in the cylinder 263, the piston rod 262 passes a vent 264 just prior to the completion of the upward movement of the feed table 259, thus allowing the free movement of the piston rod 262 until the vent 264 is again closed on the initial retraction of the piston rod 262.

During the operations just described the weight 268' has been ineffective as far as influencing the operation of the roll 260 is concerned. However, on the forward motion of the feed table 259, which is the next step in inserting the folded edge of the inner-liner and chip stock into the gripper jaws 85 and 90 of the mandrel 80, the weight 268' is only permitted to move forwardly a short distance before it engages the above mentioned stop. Thereafter continued forward movement of the feed table exerts a pull on the chain 267' which results in the roll 260 moving upwardly in an arc until it is brought in contact with the fountain glue roll 265 thus replenishing the glue on the roll 260. The roll 260 remains in an elevated position with respect to the feed table 259 until the table is retracted from its forward position and the edge thereof again lowered to the starting position. The roll 260 is held in this elevated position not only because of the action of the weight 266', but also because of the resistance offered by the piston rod 262 as it is retracted in the cylinder 263. It will be noted that during the initial downward movement of the feed table 259 the end of the piston rod 262 has passed the vent 264, thus effecting the closure thereof with the result that sufficient compression is produced in the cylinder 263 to maintain the roll 260 in an elevated position with respect to the feed table 259 during the full downward movement thereof, or until the table has again reached its lowermost position and starts upwardly, at which time the cycle of operations just described are again repeated. The bleeder valve functions during the lowering of the table to prevent an undesirable amount of compression being produced in the cylinder 263 by the piston rod 262.

At the same time the edge 267 of table 259 is retracted, leaving a sufficient portion of the folded inner-liner and body stock edge to project and be gripped in the mandrel jaws 85 and 90. The retraction of the tip 267 is accomplished by a rod 268 adjustable by adjusting nuts 269. The movable end of the rod 268 is adapted to reciprocate in a vertical support 309 attached to the machine bed and the other end of the rod is connected to the edge 267 of the feed table 259. The projecting folded edge of the combined innerliner B and body stock A is gripped in the jaws of the mandrel 80 and the rotation of the mandrel in a counter-clockwise direction rolls the innerliner against the surface of the mandrel.

The inner-liner is severed, as described above, when sufficient length thereof to form an overlap along the edges of the measured section, has been wound into an inner layer or ply. The mandrel 80 continues its rotation sufficiently to build up the desired number of plies. When the mandrel 80 stops its rotation, table 259 is retracted and the knife 270 is in a position for severing the body stock, thus completing the first phase of the winding cycle.

The mechanism for actuating the knife 270 may comprise a cam 515 mounted on the shaft 283 and provided with a race in which the roller 516 travels, the latter being carried by a link 517, the other end of which is attached to a lever 518 secured to a sprocket 519, the sprocket and the lever being mounted on a shaft 520. The roller 516 is supported by a connecting link 521 having its lower end pivotally mounted in a bracket 522 carried by the machine base. Through the linkage formed by the levers 521, 517 and 518 a rotary or rocking motion is imparted to the sprocket 519. The sprocket 519 is connected to sprocket 523 by means of a chain 524, the sprocket 523 being mounted on the shaft 525 which also carries a gear 526. The teeth of the gear 526 mesh with a rack 527 mounted in a bracket 528 suitably supported on the machine bed. The upper end of the rack 527 has a clevis which is connected to a link 271 directly connected to a lever 529, the opposite end of the latter being supported on the bracket 303.

The operation of the structure just described is as follows. The rotation of the cam 515 operates the roller 516 which in turn rocks the lever 518 through the connecting lever 517, thus rotating the sprocket 519, this motion being translated through the chain 524 to the sprocket 523 and gear 526, the latter actuating the rack 527 in an upward or vertical direction. This movement raises the link 271, causing the lever 529 to pivot on the bracket 303 and move the knife 270 upwardly in an arc. As the cam 515 continues to rotate the motion just described is reversed, and effects the lowering of the knife or shear blade 270.

Simultaneously with the feeding of the innerliner B, the body stock A is fed to the top of feed table 259 (see Fig. 19) and under a holding latch 272 which prevents backward drag on the body stock A. It continues on through rotary shear blades 273 and 274 where the body stock is severed in strips corresponding in width to the width of the inner-liner material. Continuing forwardly, the body stock A passes successively under holding plate 275, roll 260 and below shearing knife 270. Rotary shear knives 273 and 274 are driven through a silent drive mechanism over sprockets 276, 277 and 278. The sprockets 277 are movable to allow continuous drive to the shear knives 273 and 274 while feed table 259 is in motion.

The inner-liner feed units are driven from sprockets 278 over sprockets 279 and 280 and sprocket chain 281 drives rolls 232, 248 and 251, which complete the drive mechanism.

A cam 282 mounted on main drive shaft 283 rotates in a clockwise direction. A cam roll 284 is moved through a race in the cam 282 and is supported by a cam slide yoke 285 which is connected to a lever 286 by a link 287. The lever 286 is fulcrumed on a bracket 288 and is connected to a clevis rod 289 fastened to a cross bar 290. The clevis rod 289 is directly connected to a slide 291. The clevis rod 289 has an intermediate bearing support bracket 297 (see Figs. 20 and 21). Confined between the slide 291 and the support bracket 297, is a compression spring 295. A pair of connecting rods 298 have one of their ends connected to the lever 286, and the other ends slidably mounted in bearings 299. Although only one of the rods 298 is shown in Fig. 20, it will be understood that the other is oppositely disposed to the rod 289.

The slide 291 is connected with the feed table 259 by means of a link 512, the lower end of which is pivoted in a bracket formed on the slide 291 and the other end of which is connected to a lug 513 depending from the bottom of the feed table 259. It will be seen that this arrangement provides a support having movable fulcrum points which effect the raising or lowering of the feed table 259 when it is tilted upwardly and downwardly as the case may be. Further, the link 512 acts as a fixed support for the table 259 during its to and fro motion in a horizontal plane.

Referring to Figs. 20 and 21, it will be noted that the slide block 291 is mounted on a master slide 514, also capable of movement in a longitudinal direction under the following circumstances. When the slide 291 has moved forwardly a distance sufficient to effect the elevation of the table 259 to a horizontal position, by bringing the link 512 substantially to an upright or vertical position under the table 259, the clevis on the rod 289 engages the bracket 297 which thus limits any further forward motion of the slide 291, but continued movement of the lever 286 produces a forward motion of the slide 514 thus carrying the super-structure of the table 259 forwardly to its extreme position. As noted above, after the table reaches this position the end of the rod 268 coming in contact with the support 309 retracts the tip 267 of the table and the jaws of the gripper are in a receptive position to receive the folded edge of the chip stock and inner-liner, the projecting portion of the folded edge being thus tucked or inserted into the jaws of the gripper.

The pulling action of the slide 291, through linkage 289, 290, 286, 287, 285 and 284, to cam 282, lowers the table 259 to a receptive position for receiving the inner-liner. This is accomplished by the fact that the slide 291 is retracted or moved to the right in Fig. 16 with the result that the link 512 is withdrawn from a vertical supporting position to an inclined supporting position for the table 259. The slide 291 is permitted to move, depending upon the position of a latch 293 operating on a cam 294 (see Fig. 21). The reverse motion of the above linkage produces an upward travel of table 259 and the continued upward movement thereof, is effected through compression springs 295 and 296 so as to position the edge of the table 259 opposite the mandrel 80.

A glue roll 265 forms one side of a container 300 (see Fig. 19) for holding glue and the rotation of the roll 265 thus causes the glue to wet the surface of said roll as it rotates clockwise. An adjusting blade 301 (see Fig. 19) controls the amount of adhesive transmitted to the roll 260. The container 300 is carried by arms 302 supported on a bracket 303, the latter forming the upper half of bracket 304.

It should be noted from the above that having the glue roll 260 contact slightly in from the edge of the feed table 259, and the fact that the roll is of rubber, there is deposited a strip of glue in the form of a fillet, the outer border of which does not extend to the edge of the table 259. This leaves the margin of the folded edge of the inner-liner B and the chip A free of glue so that when this edge is gripped by the gripper jaws they do not come in contact with a layer of glue, with the result that the gripper jaws are practically free of glue at all times, thus avoiding a messy condition tending to interfere with the ready retraction and insertion of the folded edge of the inner-liner and chip stock. Furthermore, the strip of glue being deposited in the form of a fillet has a flowing action when the flap, formed by the folded edges of the inner-liner and chip stock, is rolled against the adjacent ply of the container body.

Roll down mechanism

As will be appreciated by those skilled in the art, some form of mechanism is required for rolling the chip stock on the mandrel during the winding operation, and also a similar mechanism for rolling the label about the container body. Referring particularly to Fig. 30, it will be seen that such a roll down mechanism may comprise a pedestal 310 which carries the hydraulically operated unit and a roller unit. The roller unit may comprise an adjustable bracket 311 supported by a lever 312 fulcrumed on a shaft 313. The bracket 311 is provided with laterally extending arms 314 between which is supported a rubber surfaced roller 315 rotating in ball bearings 316. A vertical adjustment of the bracket 311 is accomplished by means of an adjusting screw 317 provided with right and left hand threads which engage corresponding threads formed in the bracket 311, and the lever 312, adjusting the screw 317 through manipulating the hand knob 318, the bracket 311 can be raised or lowered with respect to the lever 312. Guide rods 319 are provided for maintaining the bracket 311 in alignment with the lever 312.

A transverse adjustment of the bracket 311 is obtained through a quadrant 320 which forms a part of the pivotal end of the lever 312. Cooperating with the quadrant 320 is a bell crank lever 321, mounted on the shaft 313 and adjustably attached to the quadrant, through a taper lock 322 which may comprise a conventional locking head 323 having a stud integral therewith, washers 324 and nut 325. By loosening the nut 325 and moving quadrant 320, any desired transverse adjustment may be made with respect to the lever 312 and super-structure carried thereby. The shaft 313 carrying the levers 312 and 321 is supported in bearings 326 carried by the pedestal 310.

The long arm of the bell crank lever 321 is connected by means of a link 327 to a clevis 328. The clevis 328 is connected to the piston 329 of hydraulic cylinder 330. The cylinder 330 is mounted on a table 331 forming part of the pedestal 310.

For the purpose of illustration, the mandrel 80 is shown in phantom operatively positioned with respect to the roller 315, which is preferably adjusted slightly above the center line of the mandrel 80. It will be noted that because of the above bell crank construction the movement of the piston 329 may be greatly amplified. As the operation of this mechanism is hydraulically controlled, further description thereof is included in the description of the hydraulic system. It may be emphasized at this point, however, that the roll 315, as it rounds the corners of the mandrel 80, is firmly held against these corners by the resiliency afforded by the hydraulic pressure, with the result that protruding corners are overcome, such defective corners resulting when the container body is loosely formed at the corners of the mandrel.

Stripping unit

After the container bodies have been formed upon the mandrel 80, they are moved first to a labelling station where a label is applied, after which they are ejected or stripped from the mandrel. The following description covers the unit contemplated by the present invention for accomplishing these operations.

A piston rod 332 (see Figs. 31 and 32) in hydraulic cylinder 333 is connected to a rack 334. The teeth of the rack 334 engage a pinion gear 335. The pinion gear 335 is keyed to a shaft 336, the latter being mounted in bearings 337 and 338. A driving gear 339 is also keyed to the shaft 336. The teeth of gear 339 engage teeth of a rack 340. On the right end of rack 340 is mounted a bracket 341 which supports a stripping yoke 342. The rack 334 is mounted in a horizontal slide 343 and a rack 340 is mounted in horizontal slide 344. On the forward movement of the piston rod 332, the rack 334, through engagement with the pinion gear 335, moves the rack 340 through driving gear 339. This translated motion moves a stripper yoke 342, through the stripping position which strips the container bodies along and from the mandrel 80. The reverse motion of piston rod 332 returns the stripper yoke 342 to its normal position. The stripper yokes 342 are interchangeable for various sizes of mandrels.

Label table mechanism

Most of the laminated paper container bodies produced today are provided with a label on the outside which, besides being decorative, also imparts additional moisture-proofness. To apply these labels it is the practice to arrange them in stacks and bring the leading edge into contact with the outside surface of the fabricated can body, which has a film of adhesive thereon at the time the label is applied. Simultaneously with bringing the labels into contact with the can bodies, a strip of adhesive is given to the trailing edge which serves as means for sealing the overlapping portion of the label in place. To accomplish these operations I provide the following improved labeling mechanism.

Figure 33:
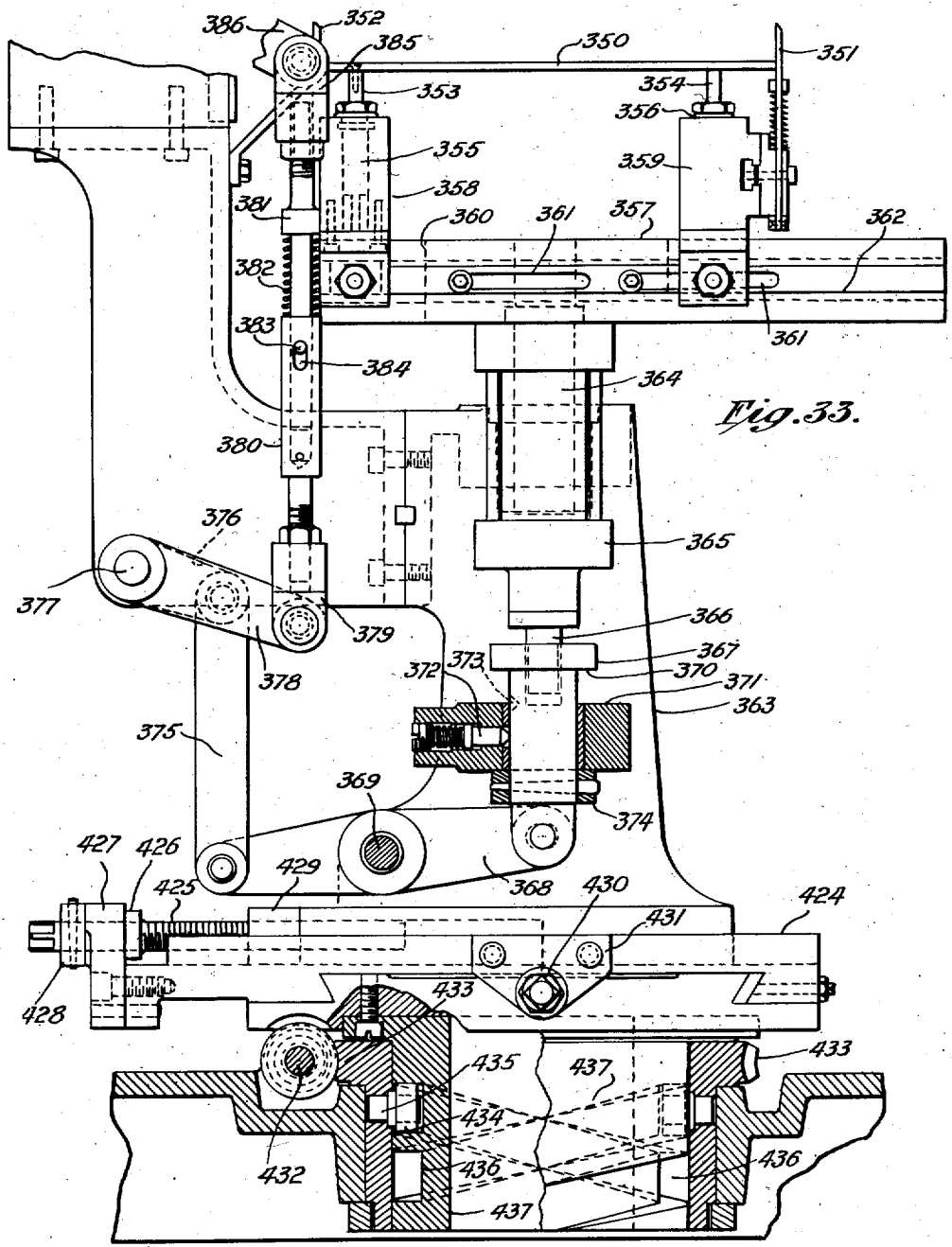
Fig. 33 is a side elevation, partly in section, of the label table and actuating mechanism.

The labels are placed on top of a table 350 and supported thereon between a spring plunger 351 and a fixed guide 352. Table 350 rides on spring loaded plungers 353 and 354, mounted in barrels 355 and 356. The barrels 355 and 356, and also spring plunger 351, are adjustable longitudinally. The table 350 (see Fig. 33) is made to accommodate individual size labels, i. e. the table is changed with each change of label size. The table 350 is provided in multiple so that several labels can be applied at one time, but for the sake of convenience, will be described as a single unit. Slides 357 allow an adjustment for guide bars 358 and 359 to suit various lengths of labels. The slides 357 are mounted on support platform 360 and are shiftable through longitudinal slots 361 so that when short labels are used, the slides 357 will not project too far beyond the center of the mandrel 80. The table supporting mechanism just described may be defined somewhat differently by saying that the barrels 355 and 356 are adjustable towards or away from each other in T-slots 362 in order to accommodate a label table 350 of given length. This adjustment is made when the table 350 is mounted, and the mounted table is then adjusted transversely with respect to the slide 357 so that the slide 357 does not project forwardly too far so as not to interfere with the label roll down units previously described.

The support platform 360 is reciprocally mounted in a pedestal 363 and guided by pillars 364 formed in the pedestal 363. This controls the alignment of the table 350 with respect to pedestal 363. The base of the cylinder 365 is mounted in a fixed position to support the platform 360. The piston 366 of cylinder 365 is connected to a slide bushing 367. The slide bushing 367 moves with the piston 366. On the downward movement of the bushing 367, lever 368 is actuated on pivot point 369. The initial stroke of the piston 366 does not effect the movement of the label supporting structure until shoulder 370 of the bushing 367 comes to rest against stop 371. When the bushing 367 comes to rest against the stop 371, the cylinder 365 moves upwardly along the piston, carrying with it the superstructure of the label table. During the period the bushing 367 is resting on the stop 371, the plunger 372 engages a notch 373 on the bushing 367, locking the latter in place. The upward movement of the table 350, is sufficient to bring the top label, of a stack of labels placed thereon, into contact with approximately the center of the opposing side of the mandrel 80. During this upward movement of the table 350 the spring plunger 351 first contacts the mandrel 80, which causes the plunger 351 to recede in its mounting at the same rate of movement as the rate of the upward movement of the table 350. This maintains the stack of labels in alignment, yet permits the approach and contact of the top label with the mandrel 80.

From the above it will be appreciated that the flexible mounting of the plungers 353 and 354 in their barrels 355 and 356 provide accommodation for variations in the height of the stack of labels on the table 350. That is to say when the stack of labels is replenished, the plungers 353 and 354 recede deeper into the barrels 355 and 356, and as the labels are worked off one at a time, the amount of this recession of the plungers 353 and 354 is correspondingly tapered off. It will be understood that at the time the leading edge of the label is applied against the mandrel 80, the container body formed thereon has its outer surface coated with adhesive, thus causing the label to be adhesively joined to the container body. It may also be noted here that simultaneously with the application of the leading edge of the label to the can body, the trailing edge of the label is provided with a strip of glue in a manner hereinafter set forth.

Upon the completion of the labelling operation, the pressure in the cylinder 365 is automatically reversed by a control system described later, thus applying pressure at the head of the cylinder 365. This reversal of pressure causes the cylinder 365 to descend, carrying with it the table super-structure mounted thereon. This downward movement of the cylinder 365 continues until the support platform 360 comes to rest on the pedestal 363, after which time continued pressure on the piston head disengages the bushing 367 from its locked position and carries the bushing, with its lever linkage, upwardly until this motion is arrested by the collar 374 engaging the lower face of the stop 371.

At the time the bushing 367 travelled downwardly, the actuating lever 368 fulcrumed on the shaft 369, thus raising the opposite end of the lever 368 which is connected by a link 375 to a lever 376 keyed to a shaft 377. Keyed to the shaft 377 is lever 378 which is connected to a clevis 379. This translated motion raises tubular shaft 380 upwardly. The shaft 380 is connected to a mating shaft 381 which is telescopic on the shaft 380. The end of the shaft 381 has a shoulder formed thereon and a compression spring 382 is placed intermediate this shoulder and the adjacent edge of the shaft 380. A stop pin 383 is carried by the shaft 381 which engages a longitudinal slot 384, thus providing a limited over travel for the shaft 381. The upper end of the shaft 381 is connected to a clevis 385 which has a direct connection with a lever 386. The function of the lever 386 will be explained elsewhere herein.

For a better understanding of the glue fountain mechanism associated with the present labeling unit, reference should be had to Figs. 34 to 38. A glue trough 390 performs the double function of being a reservoir for the glue and also acts as a housing for the glueing mechanism. The glueing mechanism comprises a lever 386 fixed to a gear 391 and drives gear 392 through an idler gear 393. The gear 391 oscillates radially on a shaft 394. The motion imparted to the gear 392 through the idler gear 393 oscillates a shaft 395 on which is keyed a strip glueing bar 396 which is provided with a rubber pad 397. The bar 396 is mounted on a pair of brackets 398 adjustable vertically by means of set screws 399 contacting the edge of the trough 390. The pair of brackets 398 are oppositely disposed and project inwardly from the edge of the trough 390. Mounted on the lever 386 is a pawl 400 which engages the teeth of a ratchet 401. The ratchet 401 is fixed to the shaft 394. The shaft 394 is supported in bearings formed as part of the side walls of the trough 390. The shaft 394 has moulded thereon a rubber roller 402 which roller forms a closure for the open side of the trough 390 and provides a glueing surface for the application of glue to the pad 397. The downward motion of lever 386 causes the pad 397 to move in a radial motion until it contacts surface of the glue roll 402, and due to the flexibility of the pad 397, conforms with the contour of the roller 402 by a ballooning action. On the upward movement of lever 386, the pawl 400 engages the teeth of the ratchet 401, rotating the shaft 394 in a counter-clockwise direction, on which is fixed the glue roll 402, thus replenishing the glue on the roll 402, which fresh application of glue is duly brought into position to be applied to the pad 397 on the next cycle.

The same upward movement of the lever 386 carries the pad 397 and bracket 398 upwardly in an arcuate path until the lower surface of the pad 397 is on the same plane as the lower edge of the mandrel 80. The adjusting screw 399 permits the alignment of the pad with the mandrel surface by limiting the further vertical or upward motion of the pad carrying structure.

It will be remembered that the shaft 381 has an over travel which is taken up by the pin 383 and slot 384. It will thus be seen that the glue pad 397, with a film of glue thereon, is brought into positive contact with the trailing edge of the several labels on the table 350 and in this manner applies a strip of glue to this edge of the labels.

The control of the amount of glue on the surface of glue roll 402 is obtained by an adjustable knife blade 403 (see Fig. 35). The adjustment of the blade 403 is obtained by an adjusting screw construction comprised of a bracket 404 fastened to the blade 403 and having a screw thread connection with adjusting screw 405 mounted in a fixed bracket 406. The screw 405 is rotated for adjustment, by hand knob 407, in bracket 406 which imparts a movement towards or away from the roll 402, thus controlling the thickness of the film of the glue on the surface of roll 402.

Figure 38:
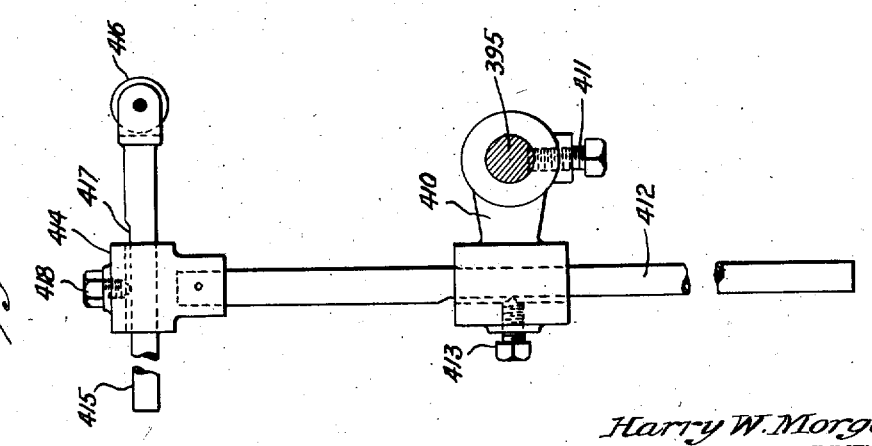
Fig. 38 is a fragmentary side elevation of the label retaining device.

Referring to Fig. 38, a label retaining device is shown comprising a lever structure consisting of a bracket 410 which is slidably adjustable on the shaft 395 by a set screw 411. The bracket 410 is provided at its free end with a bearing for supporting adjustable rod 412, the adjustment of the latter being secured by a set screw 413. The rod 412 extends transversely to the glue trough 390 and projects beyond the open end hereof and over the label table 350. The projecting end of the rod 412 is provided with a T-joint connection 414 in which is mounted a rod 415 extending downwardly at right angles to the rod 412. The rod 415 moves freely in its bearing and is reciprocated therein by force of gravity. The lower end of the rod 415 is provided with a tracer wheel 416. To prevent the rod 415 from rotating in its bearing, a keyway 417 is provided thereon which keyway is engaged by a dog pointed screw 418. It will be recalled that the shaft 395 is reciprocated radially by the gear 392 and since the bracket 410 is secured to the shaft 395, the rod 412 and its appendages are oscillated with the shaft 395. However, since the rod 415 moves freely in its bearing 414 by gravity, it remains in contact with the stack of labels engaged by the tracer wheel 416. Although the motion of the rod 412 is an arcuate one, the tracer wheel 416 may nevertheless remain in contact with the stack of labels because it is free to move in an arc which is translated into a straight line motion of the tracer wheel 416 on the stack of labels. It should be appreciated that one of the rods 412, with its associated parts, is provided for each stack of the labels.

Figure 37:
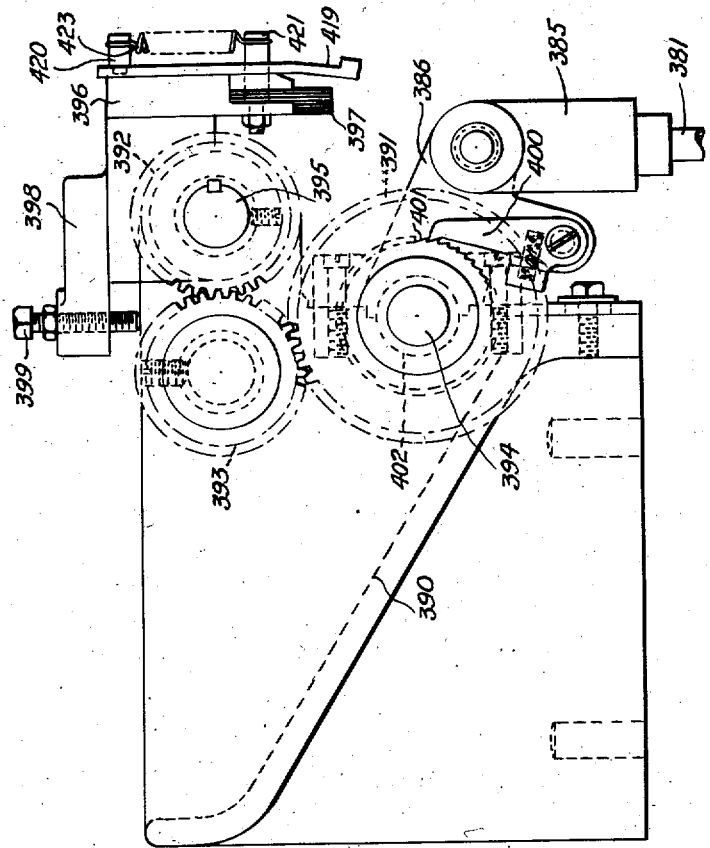
Fig. 37 is an end elevation of the glue fountain shown in Fig. 34.

Referring to Figs. 34, 36 and 37, a stripping mechanism is shown for stripping the labels from the glue pad 397 after adhesive has been applied to the trailing edge of the label. This mechanism may be carried by the bar 396 and may comprise a strip plate 419 removably supported on the bar 396 by studs 420 and 421. Near the upper edge of each end of stripper plate 419 is mounted the spring stud 420. In alignment with the spring stud 420, near the lower edge of the stripper plate 419, is a slot 422. Projecting through the slot 422 and fastened to the bar 396 is a spring stud 421. Springs 423 connect studs 420 and 421, holding the plate 419 in a down position with respect to the upper end of the slot 422. By this arrangement the plate 419 is reciprocally mounted on the bar 396.

By having the lower edge of the stripper plate 419 extend below the glue pad 397, the former will contact the labels in advance of the latter. By virtue of the stud and slot arrangement mentioned above, the stripper plate 419 is permitted to move upwardly a distance sufficient to permit the glue pad 397 to come in contact with the adjacent edge of the labels. When the label table 350 starts its downward movement, the stripper plate 419 follows temporarily this downward movement, but the downward movement of the stripper plate 419 is limited by the slot 422. By this action the lower edge of the stripper plate 419 strips the label free of the pad 397.

It may be noted that the lower edge of the stripper plate 419 normally extends beyond the lower edge of the glue pad 397, (see Fig. 37) and for that reason when the pad is replenished with glue when brought in contact with the glue roller 402, the projecting edge of the stripper blade 419 engages suitably positioned stops (not shown) carried on each side of the glue trough 390. This forces a retraction of the stripper blade 419 during the time the pad 397 is applied to the glue roll 402.

It will be appreciated that in order to properly position the table 350 with respect to the mandrel 80, having in mind the various mandrel sizes, difference in length and width of labels, and the position thereof in respect to the stripping of the containers from the winding position to the labelling position, a more or less universal adjustment of the super-structure carried by the pedestal 363 is required.

To secure an adjustment of the pedestal 363 in three dimensions, it is mounted upon a sub-base 424. A transverse adjustment is made by an adjusting screw 425 with a shoulder 426 which is mounted in a bearing 427, the opposite end of the screw 425 being held in position by a collar 428. This permits the rotation of adjusting screw 425, the threaded end of which engages corresponding threads of a block 429 fixed in the base of the pedestal 363. The longitudinal adjustment is made by adjusting screws 430 mounted in brackets 431, which are fixed to the sub-base 424. The adjustment is made by loosening one screw and tightening the other inasmuch as the screws 430 and brackets 431 are oppositely disposed with respect to each other on the sub-base 424.

The vertical adjustment of the entire pedestal structure is obtained through a worm and cam mechanism comprising a worm 432 meshing with worm gear 433 which carries rolls 434 mounted on a stud 435 supported by the worm gear 433. The roll 434 travels in a cam slot 436 of a cam 437 which may constitute part of the raising platform. For the purpose of balance, the cam structure just described is duplicated on the opposite side. The raising platform is supported in the machine bed.

Electro-hydraulic system

The various units described heretofore are hydraulically operated and the timing thereof is effected by electrical control of the hydraulic system (see Fig. 39).

This system comprises a hydraulic pumping unit, a pressure line in which is mounted a flow control valve, a series of solenoid operated valves and an accumulator and return line. The average pressure in the hydraulic system is approximately 300 pounds per square inch. A timing unit driven from the main shaft of the body stock feed table 259 operates a series of micro-switches which in turn control the solenoids, which valves in turn actuate the cylinders for the several units. Start-stop buttons are used to control certain of the electrical circuits as for example the circuits for the mandrel drive, stripper support, roll down and label table. The stations controlled by these switches can be selectively operated at the option of the operator.

The pressure system comprises a line 450 flowing through flow control and overload relief valve 451. The flow control valve 451 regulates the speed of flow of the liquid or oil, which in turn determines the speed of the piston travel in the several cylinders and is adjustable to various speeds to coordinate with the variable speed mechanical drives. From valve 451 pipe line 452 has a series of connections to the pressure side of the several solenoid operated valves. The return side of the pressure line 453 allows the oil to be returned to a sump 454.

A source of electrical power includes leads 455 and 456 which supplies the power for actuating the various solenoid valves through the switch elements controlling the various circuit organizations.

The timing of the electrical circuits is effected by the operation of the micro-switches in proper sequence by cams 457, 458, 459, 460, 461, 462 and 463. As is well known, the cams just mentioned are mounted on a common shaft and automatically effect the opening and closing of circuits controlled thereby for the respective periods covered by the design of the cam surfaces. With these general observations the specific operation of the several work stations or units will now be described more particularly.

Starting with the solenoid operated valve 464, the cam 457 closes the circuit through the contacts of micro-switch 470 which energizes the coil 469 of the solenoid valve 464. The energization of the coil 469 transfers the pressure to the feed line 465 which enters the base of the cylinder 466 and moves the piston 467 forward almost a complete stroke, thus actuating the mandrel drive as explained above. As the piston 467 nears the end of its stroke, a contact finger 441 trips the micro-switch 442 which in turn closes the circuit through the coil 471 of the solenoid valve 464. The energization of the coil 471 operates the valve 464, reversing the pressure of the feed line 475, thus temporarily arresting the further forward movement of the piston 467. Simultaneously the mandrel is brought to a stop by the actuation of the solenoid operated brake 89 (see Fig. 6) which may be operated in any convenient manner.

The brake 89 should be capable of stopping the rotation of the mandrel substantially instantaneously, but in the event the brake 89 does not fully absorb inertia of the mandrel 80 no harmful effects will result because of the clutch mechanism previously described in connection with Figs. 2 and 11. This latter feature is obvious by referring to Fig. 11, wherein it will be seen that the pawl 26 will merely be retracted from the tooth 29, as in the case when the rack 36 is restored to its normal position through the reversal of pressure effected by the micro-switch 468 energizing the coil 471 at the completion of the forward stroke of the piston which will be described presently. The temporary interruption of the forward motion of the mandrel 80 is sufficient to permit the severing of the chip stock B, with the mandrel stopped in either of positions number 1 or number 2, (shown in Fig. 40) depending upon the timing of the micro-switch 442. That is to say the contact finger 441 and the micro-switch 442 are adjustably positioned with respect to each other so that the micro-switch is operated in such timed relation as to bring the mandrel 80 to a stop in either of positions number 1 or number 2. The cutting operation forms the flap described above, and this flap is wound upon the mandrel 80, before the container body is moved to the labeling table, in the following manner. The cam 457 has an adjustable active surface 443 which, in the proper timed relation, again closes the circuit through the coil 469, which in turn transfers the pressure back to the feed line 465, thereby causing the piston 467 to move forward a full stroke.

A contact finger 440 is positioned to actuate the micro-switch 468 at the end of the forward stroke of the piston 467. This again closes the circuit through coil 471 of solenoid valve 464 and also energizes the coil 472 of the solenoid valve 473.

The operation of the solenoid valve 464 restores the piston 467 to normal position by reversing the pressure in the feed line 475.

Simultaneously, through the energization of the coil 472, the solenoid valve 473 diverts the pressure into the feed line 474 connected to the base of the cylinder 476, thus moving the piston 477 forward and thereby actuating the stripper unit. Simultaneously with the actuation of the piston 477 the pressure diverted into the other branch of the feed line 474 enters the top of the cylinder 478 thereby retracting the piston 479, which effects the withdrawal of the mandrel support as explained heretofore. Briefly stated, the operation of the stripper unit ejects the container bodies from the mandrel 80 and during this operation the mandrel support is moved backwardly and upwardly to clear the container bodies as they are being stripped off.

At the completion of the operations just described, cam 460 effects the closure of the contact 480, thus energizing the coil 481, which operates the solenoid valve 473, thus directing the oil pressure into the feed line 482. This change in direction of pressure restores the pistons 477 and 479 to normal position.

Upon the retraction of the pistons 477 and 479, cam 461 closes contact 483 and energizes coil 484 which causes the flow of pressure in the feed line 485. This actuates the roll down pistons 486 and 487, and at the same time the back pressure is locked by a self-centering valve 488. The reason for locking this pressure is that the pistons 486 and 487 are reciprocated in the cylinders 489 and 490 by the roller action on the mandrel 80. It will be appreciated that the reciprocation of the pistons 486 and 487 only occurs in the fabrication of containers having corners, such as rectangular, square, etc. in cross section.

A further reason for locking the pressure in the circuit just described is to force the rolls 315, during the roll down operation, to follow at all times the contour of the container, as normally there is a tendency on the part of the rolls 315 to skip or jump the corners, resulting in the application of non-uniform pressure at the corners. This tendency to jump or skip corners is eliminated by providing an accumulator 491 in circuit with the base portion of the pistons 486 and 487. The area of the accumulator 491 is considerably greater than the combined areas of the pistons 486 and 487. The accumulator 491 can be adjusted for varying the pressure exerted on the rolls 315.

The operation of the cam 462 timely effects the closure of contacts 492, thus energizing the coil 493 and thereby effecting a restoration of the pistons 486 and 487, through the reversal of the pressure in the feed line 494.

The cam 463 effects the closure of contacts 495 which energizes the coil 496 of the solenoid valve 497, applying pressure to the base of the cylinder 498 which carries the piston 499, and raises the label table 350 to operative position with respect to the mandrel 80. At the extreme upward stroke of the piston 499, micro-switch 500 is closed which energizes coil 501, causing the oil flow to be diverted to the feed line 502 which restores the piston 499 back to normal. The energization of the coils 496 and 501 is in close sequence, but there is sufficient time lag to permit the complete raising of the label table 350 to perform its desired function.

The cam 458 closes the contacts 502, thus energizing the coil 503 and operating the solenoid valve 504, changing the flow of oil to the feed line 505, thus operating the piston 506 in the cylinder 507 controlling the gripper unit. The closure of contacts 508 by the operation of the cam 459 energizes the coil 509, which in turn effects a diversion of the oil to feed line 510, through the actuation of valve 504, thus opening the gripper.

It is obvious from the foregoing that each one of the cylinder pistons are operated for a complete stroke, in timed relation with one another, during a complete cycle of forming the container body.

*Diagrammatic arrangement of machine*

The fabrication of a container in accordance with the present invention is diagrammatically shown in Fig. 1. From the above description it will be appreciated that the invention contemplates a continuous feeding of a fibrous body material in sheet form in one direction, and a continuous feeding of an oil and grease proof material, also in sheet form, in the opposite direction, the leading edges of the two materials being brought together and overlapped at the mandrel station where the container body is rolled down. More particularly the fibrous material may be chip board, designated generally by the reference character A, and the inner-liner material may consist of any grease proof material such as glassine, designated generally by the reference character B.

A roll of chip stock A may be mounted on a reel at the right of the machine and the chip is fed under the roll 128, over roll 129, under rolls 137 and 139 which engage the chip sheet A with the glue roll 131 which turns on the glue roll 130 partly submerged and rotatable in an adhesive contained in the main glue tank 199 at which station the upper or outer surface of the chip A is coated throughout its entire length with the adhesive. This system of rolls cooperatively function as feed rolls in carrying the sheet of chip A to rolls 138 and around the dance roll 182, thence to roll 183. A secondary glue tank 216 contains an adhesive into which dips the roll 130 which engages the roll 184 mounted thereover and positioned slightly below the normal path of travel of the chip A. Rolls 185 and 186 are symmetrically positioned over the roll 184 which may be raised and lowered intermittently, as described above, to engage the top surface of the chip A and thus cause adhesive to be applied intermittently to the lower or inner surface of the chip.

The chip A is next led to the feed table 259, pivotally mounted upon each side along one edge. The table 259, as understood from the above, moves to and fro in a horizontal plane and swings arcuately about its pivotal points 292 as set forth above. In the continued forward movement of the chip A it passes between slitting knives 213 and 274. After being slit the strips of the chip A move forward to the edge of the table 259.

During the advance of the sheet of chip board A, the sheet of the inner-liner B has been feeding from the opposite end of the machine to meet and be consolidated with the sheet A. The sheet B is fed between feed rolls 281 and 282, around dance roll 233 and over tension feed roll 248. To prevent back slipping of the inner-liner B, a gravity bar 249 is provided. The inner-liner is then passed between the slitting knives 250 and 251 which slit the sheet B longitudinally so as to form strips of widths corresponding to the cut strips of the chip stock A. The inner-liner is then fed between the guide roll 254 and the table top 258, until the leading edge of the inner-liner projects slightly beyond the edge of the table top 258 and positioned above the chip stock which has been fed to the edge of the table 259. The glue roll 260 then moves downwardly to apply a strip of glue along the leading edge of the inner-liner B and at the same time this edge is adhesively joined to the edge of the chip stock A, the opposing surface of the latter having been previously coated with adhesive. At this time the table 259, pivoting on point 292, moves upwardly to a horizontal position and the roll 260 moves upwardly to contact the glue roll 265. The purpose of bringing the roll 260 in contact with the glue roll 265 is to replenish the glue thereon when the roll is lowered for the next cycle of operation. At this stage the table 259 moves forwardly with the folded edge of the combined inner-liner and chip stock slightly protruding from the edge of said table so as to be inserted in the gripper jaws 85 and 96 of the mandrel 86.

When the folded edge of the chip stock and inner-liner has been gripped by the gripper jaws 85 and 96, the table 259 is retracted in a horizontal plane so as to clear the mandrel 86 and is held in that position until the mandrel stops rotating. Simultaneously with the retraction of the table 259 the roll down roller 315 is brought into contact with the mandrel 86 which rolls the container body as previously explained. When the mandrel has rottaed to form the desired number of plies in a given container body, the cutter knife 270 moves downwardly and shears the chip stock A along the edge of the table 259. It should be noted that upon the rotation of the mandrel 86, a sufficient length of the inner-liner B, to form a complete layer having a slight overlapping edge, is wound against the body of the mandrel. The inner-liner is cut to the desired length by functioning of serrated knife edge 267 as will be understood from the foregoing description.

It will be appreciated from the description of the stripper and labeling mechanisms that after the container body has thus been formed it is moved longitudinally along the mandrel by the stripper so as to position the body operatively with respect to the label table where the label is applied and after which the completed container body is ejected from the mandrel.

Of the many novel features embodied in the present invention, it is worthy to note that because of the improved gripping device and mandrel supporting mechanism, a longer mandrel may be used than permitted in previous machines. With an increase in length of the mandrel, paper of greater width may be used with the result that a larger number of container bodies may be wound on the mandrel at one time, which of course increases substantially the production of the machine.

It may also be noted that because of the improved construction of the labeling mechanism a greater number of labels may be handled without serious difficulty such as experienced in the prior practice of the art. One such difficulty was maintaining the labels in proper stack formation, since they normally had a tendency to fly upwardly because the supporting table moved downwardly faster than the action of gravity on the labels, with the result that the labels were partly suspended in mid-air a fraction of the time the label table was returning to normal position. With the present construction the labels are positively held in contact with the label table at all times. This feature permits the speeding up of the labeling operation which adds materially to the production capacity of the machine.

Another important feature embodied in the present invention, which feature will be appreciated by those skilled in the art, is the prevention of "spiraling" of the paper in winding it on the mandrel. If the paper is of considerable width this "spiraling" effect is greatly exaggerated, producing ripples in the paper which would cause tearing of the paper at different points during its passage through the machine. This "spiraling" effect is overcome or avoided by the improved bearing construction of the spindle on the end of which is mounted the mandrel, and the improved supporting mechanism for the opposite or free end of the mandrel. In this connection it may also be mentioned that improved adjusting means for aligning, and maintaining in alignment, the various units embodied in the machine materially assist in feeding the inner-liner and chip stock uniformly through the machine.

While I have described a preferred embodiment of my invention, I appreciate that in view of this disclosure many changes, substitutions or omissions of parts will readily suggest themselves to those skilled in the art, but it is my desire to cover all such modifications as come within the spirit and scope of the invention as defined by the appended claims. An illustration of such a modification may constitute substituting mechanical means for operating the various units now shown as operated hydraulically.

What is claimed is:

1. The combination with a machine for making laminated inner-liner fibrous tubes comprising a mandrel, means for supporting the mandrel, means for actuating the mandrel, including a selective transmission gear system and a spindle mechanism, means for continuously applying adhesive on one side of the body stock and intermittently applying adhesive on the opposite side thereof for a distance appreciably greater than a sheet of inner-liner of measured length, means for cutting the body stock and the inner-liner into strips of corresponding widths, means for folding the leading edge of the inner-liner sheet over the cut end of the body stock, a gripping device mounted within the mandrel and comprising jaws adapted to grip the folded edges of the combined body stock and inner-liner, a label table having a plurality of compartments adapted to hold stacks of labels corresponding in width to the width of the container body, means for bringing the labels in contact with the container bodies, a stripper mechanism for stripping the formed container body from the mandrel, hydraulic means for selectively operating the said work performing units, and a timing system for controlling the hydraulic system.

2. The combination with a machine for making laminated inner-liner fibrous tubes comprising a mandrel and actuating means therefor, including a spindle mechanism, a selective transmission gear system for driving the spindle mechanism, a mandrel supporting mechanism, a glue feeding mechanism for continuously applying glue to one surface of the body stock, a glue feeding mechanism for intermittently applying glue to the opposite surface of the body stock, means for cutting the body stock and the inner-liner into strips of corresponding widths, an inner-liner feeding unit in combination with a feed table for combining the leading edges of the inner-liner and the body stock, a gripping device mounted within the mandrel and comprising jaws adapted to grip the folded edge of the combined body stock and inner-liner, a label table comprising a plurality of stacks of labels, a container body and a label roll down mechanism, a stripper mechanism for advancing the container bodies along the mandrel, and an electro-hydraulic system for controlling the operation of the several units.

3. The combination with a machine for making laminated inner-liner fibrous tubes comprising a mandrel and actuating means therefor, including a spindle mechanism, a selective transmission gear system for driving the spindle mechanism, a mandrel supporting mechanism, a glue feeding mechanism for continuously applying glue to one surface of the body stock, a glue feeding mechanism for intermittently applying glue to the opposite surface of the body stock, a glue fountain for applying a strip of glue to the trailing edge of a sheet of inner-liner of measured length, an inner-liner feeding unit in combination with a feed table toward which the leading edges of the inner-liner and the body stock are fed so as to be positioned to be folded along their leading edges, a gripping device mounted within the mandrel and comprising jaws adapted to grip the folded edge of the combined body stock and inner-liner, a label table, a stripper unit, an electro-hydraulic system for selectively operating the said work performing units, and a timing system for determining the timed relation of the actuation of the several units.

4. The combination with a machine for making laminated inner-liner fibrous tubes comprising means for advancing the leading edge of a sheet of chip stock in one direction, means for applying glue continuously on one surface of the chip stock, means for applying glue intermittently on the opposite surface thereof, means for advancing a sheet of inner-liner material in the opposite direction, means for combining the edges of the chip stock and the inner-liner, a mandrel structure including a gripper provided with jaws, means for inserting the combined edges of the chip and the inner-liner into the gripper jaws, means for closing the gripper jaws, means for severing the inner-liner into sections substantially corresponding in length to the sections of chip stock having glue intermittently applied thereto, means for rotating the mandrel a preselected number of times, a roll down mechanism for winding the chip stock on the mandrel, means for stopping the rotation of the mandrel to cut the chip stock to a given length, means for again starting the rotation of the mandrel for a fraction of its initial period of rotation after which the mandrel is again stopped, means for withdrawing the mandrel support and simultaneously operating a stripper, means for bringing a label table into position with a formed container body, means for withdrawing the roll down mechanism, and means for ejecting the completed container body from the mandrel.

5. The combination with a machine for making laminated inner-liner fibrous tubes comprising means for advancing the leading edge of a sheet of chip stock in one direction, means for applying glue continuously on one surface of the chip stock, means for applying glue intermittently on the opposite surface thereof, means for advancing a sheet of inner-liner material in the opposite direction, a combination feed table toward which the leading edge of the chip stock and the inner-liner material are fed so as to overlap and form a fold along their leading edges, a mandrel structure including a gripper provided with jaws, means for inserting the folded edge of the chip and the inner-liner into the gripper jaws, means for closing the gripper jaws, means for severing the inner-liner into sections substantially corresponding in length to the sections having glue intermittently applied thereto, means for rotating the mandrel a pre-selected number of times, a roll down mechanism for winding the chip stock on the mandrel, means for stopping the rotation of the mandrel to cut the chip stock to a given length, means for again starting the rotation of the mandrel for a fraction of its initial period of rotation after which the mandrel is again stopped, means for withdrawing the mandrel support and simultaneously operating a stripper, means for bringing a label table into position with a formed container body, means for withdrawing the roll down mechanism, and means for ejecting the completed container body from the mandrel.

6. The combination with a machine for making laminated inner-liner fibrous tubes comprising a mandrel, a mandrel drive and hydraulic means for actuating the same, a gripper unit and hydraulic means for actuating the same, a roll down mechanism and hydraulic means for actuating the same, a mandrel supporting mechanism and hydraulic means for actuating the same, a label table and hydraulic means for operating the same, a mandrel stripping mechnism and hydraulic means for actuating the same, and a timing system for operating said hydraulic means selectively, whereby the several steps in the fabrication of the tubes are in timed relation with respect to one another.

7. The combination with a machine for making laminated inner-liner fibrous tubes comprising a mandrel and a driving unit therefor, a solenoid operated valve for controlling the mandrel drive, a support and a stripper for the mandrel, a solenoid operated valve for controlling the mandrel support and stripper, a gripper carried by the mandrel, a solenoid operated valve for controlling the gripper, a label table, a solenoid operated valve for operating the label table, a roll-down mechanism for forming the body material of the container about the mandrel and applying a label, and a solenoid operated valve for operating the roll down mechanism.

8. The combination with a machine for making laminated inner-liner fibrous tubes comprising a mandrel and a driving unit therefor, a solenoid operated valve for controlling the mandrel drive, a support and a stripper for the mandrel, a solenoid operated valve for controlling the mandrel support and the stripper in timed relation with respect to each other so as to operate substantially simultaneously, a gripper carried by the mandrel, a solenoid operated valve controlling the gripper, a label table, a solenoid operated valve for operating the label table, roll-down mechanism for forming the body material of the container about the mandrel and applying the label, and a solenoid operated valve for operating the roll-down mechanism, said roll-down mechanism including two units operated substantially simultaneously, one of said units rolling down the container body and the other applying a label to a completely formed container body.

9. The combination with a machine for making laminated inner-liner fibrous tubes comprising a mandrel, a mandrel drive and hydraulic means for actuating the same, a solenoid operated valve for controlling said hydraulic means, a support and a stripper for the mandrel, separate hydraulic means for actuating the stripper and mandrel support independently, a solenoid operated valve for controlling the hydraulic means for operating the mandrel support and the stripper in timed relation with respect to each other, a gripper unit carried by the mandrel and hydraulic means for actuating the same, a solenoid operated valve for controlling the gripper unit, a label table and hydraulic means for actuating the same, a solenoid operated valve for controlling the actuating means for the label table, a roll-down mechanism for forming the body material of the container about the mandrel and applying a label, said roll-down mechanism including two units operated substantially simultaneously, one of said units rolling down the container body and the other applying a label to a completely formed container body.

10. In a machine for making laminated inner-liner fibrous tubes, a mandrel and a gripper mounted therein, means for driving said mandrel including a selective transmission system, a spindle operatively connected to said transmission system, said spindle including means for connecting the gripper thereto, and means for independently controlling the rotation of the mandrel and the operation of the gripper, said control means including separate hydraulic means for actuating the mandrel drive and the gripper independently, and a solenoid operated valve for operating the several hydraulic means.

11. In a machine for making laminated inner-liner fibrous tubes, a mandrel and a gripper mechanism mounted therein, means for rotating said mandrel and actuating said gripper, including a selective transmission system, a spindle mechanism inserted between the transmission system and the mandrel, means for pre-selecting the gears for operating the spindle, means on the spindle for normally maintaining the gripper closed, means for opening the gripper in timed relation with the rotation of the mandrel, and hydraulic means for operating the pre-selected set of gears connected to the spindle and opening the gripper, said hydraulic means being independently controlled by separate solenoid operated valves.

12. In a machine for making laminated inner-liner fibrous tubes, a mandrel and a gripper mechanism mounted therein, said mechanism comprising a self-contained unit including a housing and a cover plate therefor, the cover plate having a transverse slot and teeth formed along one edge thereof, a movable jaw mounted longitudinally of the housing and having an eccentric portion, the eccentric portion being provided with teeth correspondingly shaped to the teeth formed in the cover plate but positioned in staggered relation thereto, the eccentric portion being adapted to protrude slightly through the slot in the cover plate and bring the two sets of teeth into interlocked relation with each other, and means including a longitudinal projection formed on a rod for engaging the movable gripper jaw, whereby the jaws are opened and closed.

13. In a machine for making laminated inner-liner fibrous tubes, a mandrel and a gripper mechanism mounted therein, said mechanism comprising a self-contained unit including a housing and a cover plate therefor, the cover plate having a transverse slot and teeth formed along one edge thereof, said toothed edge forming a stationary jaw, a jaw rotatably mounted longitudinally of the housing and having an eccentric portion, the eccentric portion being provided with a longitudinal slot having teeth formed along one edge thereof, the teeth of the stationary jaw and the rotatable jaw being in staggered relation with respect to one another and adapted to interlock by a rotary motion of the movable jaw, the plane of the teeth of the stationary jaw passing substantially through the pivotal center of the rotatable jaw, whereby the opposing edge of the eccentric portion is parallel with the plane surface of the stationary jaw teeth when the jaws are in gripping engagement, the eccentric portion being adapted to protrude slightly through the slot in the cover plate and when the jaws are closed form a ridge which correspondingly enlarges the contour of the mandrel, the teeth on the rotatable jaw being adapted to roll the gripped edge of the body stock against the inner wall of the container body upon the completion of the winding operation.

14. In a machine for making laminated inner-liner fibrous tubes, a mandrel having a gripper device mounted therein and provided with means for gripping the protruding edge of a body stock during the winding operation, said means including a rotatable jaw member having an eccentric portion adapted to protrude slightly above the surface of the mandrel during the winding operation, and said jaw member being provided with a longitudinal slot the lower edge of which has spaced transverse slots forming an interrupted ledge having teeth adapted to roll the gripped edge against the inner wall of the container body upon the completion of the winding operation.

15. In a machine for making laminated inner-liner fibrous tubes, a mandrel having a gripper device mounted therein and provided with elements for gripping the protruding edge of a body stock during the winding operation, one of said elements comprising a rotatable jaw member having an eccentric portion adapted to protrude and retract through a longitudinal opening in the mandrel, said jaw member being provided with a longitudinal slot the lower edge of which has spaced transverse slots forming an interrupted ledge having teeth complementary to a row of teeth formed in the adjacent edge of the mandrel opening, said sets of teeth being in staggered relation with respect to each other and adapted to interlock by a rotary motion of the jaw member, said jaw member when protruded enlarging the contour of the mandrel and when retracted being adapted to roll the gripped edge of the body stock against the inner wall of the container body upon the completion of the winding operation.

16. In a machine for making laminated inner-liner fibrous tubes, a mandrel, a mandrel supporting device including a tail stock mechanism carried on an adjustable support movable longitudinally with respect to the mandrel, the tail stock having a mounting permitting it to move away from the end of the mandrel in a longitudinal direction and swing upwardly in an arc to clear the mandrel, and means for co-ordinating the longitudinal and upward movement of the tail stock, said means including a slide mechanism capable of producing the longitudinal movement and a slide mechanism capable of producing the arcuate movement, said slide mechanisms being inter-related and designed to produce a compound movement resolved into an initial sequence, which sequence is reversed during the completion of the cycle, during which the mandrel support disengages and re-engages the end of the mandrel.

17. In a machine for making laminated inner-liner fibrous tubes, an inner-liner feeding and combining mechanism comprising a pair of brackets for supporting a roll of body stock on one end of the machine and another pair of brackets for supporting a roll of inner-liner on the opposite end of the machine, said brackets being adjustable laterally so that the body stock and the inner liner sheets may be brought into alignment, a mechanism for feeding the body stock including a switch device controlled by a dance roll, said switch device being adapted to regulate a clutch mechanism for controlling the feeding of the paper, cutter blades for separately slitting the body stock and the inner-liner into strips of corresponding widths, a feed table for overlapping the leading edges of the body stock and the inner-liner, and a glue roll controlled by a pneumatic cylinder and piston for applying glue to the edge of the inner-liner.

18. In a machine for making laminated inner-liner fibrous tubes, a roll down mechanism comprising a roller unit and an hydraulically operated unit, the roller carried by a bracket unit including a roller adjustable vertically and transversely with respect to a mandrel, the hydraulic unit being connected to the roller unit and including a piston hydraulically operated and arranged to have the pressure exerted thereagainst automatically locked during the roll down operation, whereby the roller is firmly held against the corners of the mandrel by the resiliency afforded by the hydraulic pressure.

19. In a machine for making laminated inner-liner fibrous tubes, a mandrel rotatably mounted, a station including means for winding a container body stock upon the mandrel, a labeling station, a stripper for moving a formed container body along the mandrel from the winding station to the labeling station, a roll down mechanism for each of said stations comprising a roller unit and an hydraulically operated unit, each of the roller units including a roller adjustable vertically and transversely with respect to the mandrel, each of the hydraulic units being connected to one of the roller units and including a piston hydraulically operated, the hydraulic units being controlled by a hydraulic system including a pressure line to which the hydraulic units are connected, an accumulator also connected to said pressure line, and a self-centering solenoid operated valve included in said pressure line, whereby the back pressure is locked in said feed line and the accumulator compensates for any increase in pressure occasioned by the rollers contacting the corners of the mandrel during the rotation of the latter.

20. In a machine for making laminated inner-liner fibrous tubes, a mandrel and a gripper mounted therein, means for rotating the mandrel including a selective transmission system, said system being of the quick change gear type and adapted to rotate a shaft a predetermined number of times in accordance with the selection made of the gears, a pinion and a rack adapted to rotate the driving shaft approximately 180 degrees by the downward movement of the rack, means including a ratchet mechanism for translating the rotation of the driving shaft to a gear train including a mating gear carried on the shaft which mounts the selective gears, the ratio of the driving gear to its mating gear being predetermined so that the shaft for the selective gears is rotated a plurality of turns in a given cycle.

21. The rack structure as claimed in claim 20, wherein the return of the rack is an idle stroke as far as operating the selective gears is concerned.

22. The rack structure as claimed in claim 20, wherein an over travel is provided in the forward stroke of the rack so that proper adjustments may be made to insure the rotation of the mandrel driving shaft to a position where the jaws of the gripper will always be in a vertical plane.

23. The rack structure as claimed in claim 20, wherein the gear transmission system is controlled by a gear shafting arrangement including a lever adapted to be moved longitudinally of a spline shaft to effect a desired pre-selection of the gears for rotating the spline shaft.

24. In a machine for making laminated inner-liner fibrous tubes, a mandrel having a gripper mounted therein, means for actuating the mandrel and the gripper including a selective gear transmission system adjustably connected to a spline shaft, a driving source for operating the gear system, a spindle mechanism including a spindle, a flexible coupling interposed between the spline shaft and the spindle, one end of the mandrel being supported on the free end of the spindle and the other end being rigidly supported by a tail stock device, a gripper rod concentrically mounted in the spindle and adapted to operate the gripper mechanism, and means for rotating the gripper rod, whereby the gripper mechanism is functioned.

25. In a machine for making laminated inner-liner fibrous tubes, a mandrel structure including a gripper mounted therein, said gripper having a stationary jaw and a movable jaw, means for rotating the mandrel including a spindle operatively connected to the mandrel structure, roller bearings for supporting the ends of the spindle, a bushing intermediate the bearings and slideably mounted on the spindle, a gripper rod rotatably mounted within one end of the spindle and concentric therewith, said gripper rod being connected to the gripper and rotated by a slot and roller connection between the bushing and the gripper rod, a compression spring for actuating the bushing in one direction on the spindle whereby the gripper jaws are normally closed, a linkage mechanism hydraulically operated for moving the bushing in the opposite direction whereby the gripper jaws are opened, and braking means for stopping the rotation of the spindle.

26. The gripper device as claimed in claim 14, wherein the gripper device is a self-contained unit readily removable from the mandrel.

27. In a machine for making laminated inner-liner fibrous tubes, a mandrel, a mandrel supporting device including a tail stock mechanism carried on an adjustable support movable longitudinally with respect to the mandrel, the tail stock having a mounting permitting it to move away from the end of the mandrel in a longitudinal direction and swing upwardly in an arc to clear the mandrel, and means for coordinating the longitudinal and arcuate movement of the tail stock, said means including a slide mechanism capable of producing the longitudinal movement and a slide mechanism capable of producing the arcuate movement, a downward movement of the slide mechanism for producing the longitudinal movement of the tail stock being effected hydraulically, which downward movement continues until a locking arrangement becomes effective to lock the slide mechanisms together for producing the arcuate movement of the tail stock, by the continued downward movement of the first slide mechanism.

28. In a machine for making laminated inner-liner fibrous tubes, in combination, a mandrel structure including a gripper and an inner-liner feeding and combining mechanism, comprising means for feeding an inner-liner, means for controlling the feed of the inner-liner, means for slitting the inner-liner into predetermined widths, means for severing the strips of the inner-liner into predetermined lengths, means for feeding a body stock in the opposite direction, including a feed table pivotally mounted at one end and having the opposite end thereof movable in an arc, means for moving the feed table longitudinally to a retracted and to a forward position, the edge of the table when lowered being operatively positioned so that the edges of the body stock and the inner-liner overlap, means for combining the overlapped edges of the body stock and inner-liner and simultaneously applying a strip of glue to the edge of the inner-liner, means for bringing the folded edge of the inner-liner and body stock into operative position with respect to the jaws of the mandrel, and means for retracting the tip of the table so that the folded edge of the inner-liner and body stock may be inserted into the jaws of the mandrel.

29. In a machine for making laminated inner-liner fibrous tubes, an inner-liner feeding and combining mechanism comprising a pair of feed rolls for feeding a sheet of inner-liner, a pair of slitter knives for cutting said inner-liner into strips of predetermined width, a dance roll inserted between the feed rolls and the slitter knives, and means controlled by the dance roll for interrupting the rotation of the feed rolls, including a clutch controlled by a micro-switch cooperatively positioned with respect to the dance roll, means for advancing a sheet of body stock in the opposite direction, including a feed table, a mechanism for raising and lowering one end of the feed table and moving the table to and fro, a pair of shearing blades carried by the table and adapted to cut the body stock in strips of widths corresponding to the widths of the strips of the inner-liner, and a glue roll for applying glue to the edge of the inner-liner.

30. The means for combining the overlapped edges of the body stock and the inner-liner as claimed in claim 28, wherein the combining and glue applying means consist of a glue roll and pneumatic means for actuating the same, the upward movement of the table effecting the actuation of the pneumatic means to bring the glue roll into contact with the edge of the table with the overlapped edges of the body stock and the inner-liner therebetween, and the forward movement of the table effecting the operation of a mechanism for raising the glue roll from the table and bringing it in contact with a fountain glue roll to replenish the glue on the glue roll.

31. The means for severing the strips of the inner-liner into predetermined lengths as claimed in claim 28, wherein the severing means includes a cutter blade rotatably mounted and having a guide rod movable with and closely spaced to the cutter blade, so that the inner-liner strips pass therebetween and in loose contact therewith and when tension is produced on the inner-liner strips by the upward movement of the feed table the cutter blade is carried upwardly by the inner-liner to within striking engagement with a mating cutter blade.

32. In a machine for making laminated inner-liner fibrous tubes, an inner-liner feeding and combining mechanism comprising a pair of feed rolls for feeding a sheet of inner-liner, a pair of slitter knives for cutting said inner-liner into strips of predetermined width, a dance roll inserted between the feed rolls and the slitter knives, and means controlled by the dance roll for interrupting the rotation of the feed rolls, including a clutch controlled by a micro-switch cooperatively positioned with respect to the dance roll.

33. In a machine for making laminated inner-liner fibrous tubes, an inner-liner feeding and combining mechanism comprising a feed table for overlapping the leading edges of a body stock and an inner-liner, the feed table being pivotally mounted at one end and having the opposite end thereof movable in an arc, means for moving the feed table longitudinally to a retracted position and to a forward position, the arcuate movement of the feed table being effected by a slide mechanism including a linkage controlled by a cam, the lowering of the table edge being effected by a pulling action on the slide mechanism and the elevation of the table being effected by a reverse action of the slide mechanism.

34. In a machine for making laminated inner-liner fibrous tubes, an inner-liner feeding and combining mechanism comprising a feed table for overlapping the leading edges of the body stock and an inner-liner, the feed table being pivotally mounted at one end and having the opposite end thereof movable in an arc, means for raising and lowering the feed table, means for moving the feed table to and fro in a horizontal position, means for severing the body stock, including a link mechanism comprising a system of levers, one of said levers carrying a shearing blade adapted to be brought in contact with the tip of the feed table when the latter is held in a retracted elevated position.

35. The feed table structure as claimed in claim 34 wherein the leverage system for actuating the shearing blade includes a rack connected to a lever pivoted on the hinged end of the table, said lever on its opposite end being connected to the shearing blade so that an arcuate motion is imparted to the shearing blade to effect the severing of the body stock.

36. The roller unit as claimed in claim 18, wherein the vertical adjustment of the bracket carrying the roller is effected by means of an adjusting screw, and the transverse adjustment is effected by a quadrant forming part of the pivotal end of the bracket, the quadrant being connected to a bell crank lever actuated by a piston, whereby the movement of the piston may be greatly amplified.

37. The timing system as claimed in claim 6 wherein the sequence of operation of the hydraulic units set forth is such that the mandrel drive, mandrel support and stripper mechanism are controlled by a common start-stop button, the roll down mechanism by another start-stop button and the label table by another start-stop button, the several start-stop buttons including electrical circuits which actuate the individual hydraulic means for the units specified.

38. The timing system as claimed in claim 6, wherein the sequence of operation of the hydraulic units set forth is such that the mandrel drive is inactive during the time the stripper and mandrel support mechanisms are actuated, and vice versa the stripper and mandrel support mechanisms being inactive during the operation of the mandrel drive.

39. The timing system as claimed in claim 6, wherein the hydraulic means for actuating the mandrel driving mechanism, the label table mechanism and the roll down mechanisms function simultaneously, and during that period the hydraulic means for actuating the stripper mechanism, the mandrel support mechanism and the gripper actuating mechanism are inactive.

40. The timing system as claimed in claim 6, wherein the mandrel rotating mechanism, the roll down mechanisms and label table mechanisms are functioning simultaneously, and the stripper mechanism, the mandrel support actuating mechanism and the gripper mechanisms are actuated simultaneously during the interval that the mandrel rotating mechanisms, the roll down mechanisms and label table mechanisms are inactive.

41. In a machine for making laminated innerliner fibrous tubes, a mandrel and actuating means therefor, including means for rotating said mandrel and means for stopping said mandrel, said rotating means and said stopping means operating automatically and in phase relation so as to produce two cycles in the complete operation of forming a container body on one section of the mandrel, a roll down mechanism for winding the body stock on the mandrel, means for severing a given length of the body stock at the end of the first cycle of the winding operation, and means for again starting the rotation of the mandrel after the severing operation to complete the second cycle of the winding operation before moving the container body along the mandrel.

HARRY W. MORGAN.